United States Patent
Oyaizu

(10) Patent No.: US 8,085,986 B2
(45) Date of Patent: Dec. 27, 2011

(54) IMAGE PROCESSING APPARATUS AND METHOD FOR PROCESSING IMAGES MORE NATURALLY AND SHARPLY

(75) Inventor: Hideki Oyaizu, Tokyo (JP)

(73) Assignee: Sony Corporation, Tokyo (JP)

( * ) Notice: Subject to any disclaimer, the term of this patent is extended or adjusted under 35 U.S.C. 154(b) by 1087 days.

(21) Appl. No.: 11/835,121

(22) Filed: Aug. 7, 2007

(65) Prior Publication Data

US 2008/0317289 A1    Dec. 25, 2008

(30) Foreign Application Priority Data

Aug. 8, 2006   (JP) ................. 2006-216022

(51) Int. Cl.
*G06K 9/00*   (2006.01)
(52) U.S. Cl. ...................................... 382/107
(58) Field of Classification Search ................... 382/107
See application file for complete search history.

(56) References Cited

U.S. PATENT DOCUMENTS

| | | | |
|---|---|---|---|
| 7,058,227 B2 * | 6/2006 | De Haan et al. ............. | 382/236 |
| 2004/0234136 A1 * | 11/2004 | Zhu et al. ..................... | 382/224 |
| 2005/0030316 A1 * | 2/2005 | Sirtori et al. ................. | 345/546 |
| 2005/0163355 A1 * | 7/2005 | Mertens ....................... | 382/128 |
| 2005/0206786 A1 * | 9/2005 | Leaback ....................... | 348/452 |
| 2006/0072790 A1 * | 4/2006 | Wittebrood et al. .......... | 382/107 |

FOREIGN PATENT DOCUMENTS

JP      2005-517251      6/2005

* cited by examiner

*Primary Examiner* — David Zarka

(74) *Attorney, Agent, or Firm* — Finnegan, Henderson, Farabow, Garrett & Dunner, L.L.P.

(57) ABSTRACT

There is provided an image processing apparatus including motion vector extracting means for extracting a motion vector on a pixel basis from each of a plurality of input images, direct motion vector generating means for generating a direct motion vector to a pixel on an image for processing from a pixel on each of the plurality of input images, on the basis of motion vectors extracted by the motion vector extracting means, and synthesizing means for synthesizing the plurality of input images by using a pixel value of the pixel on each of the plurality of input images, on the basis of the direct motion vector generated by the direct motion vector generating means.

20 Claims, 23 Drawing Sheets

IMAGE PROCESSING APPARATUS AND METHOD FOR PROCESSING IMAGES MORE NATURALLY AND SHARPLY

BACKGROUND OF THE INVENTION

1. Field of the Invention

The present invention relates to an image processing apparatus and method, a program and a medium storing thereon the program, and particularly to an image processing apparatus and method, a program, and a medium storing thereon the program, all configured to enable taken images to be processed more naturally and sharply.

2. Description of Related Art

An imaging device used in digital still cameras and digital video cameras with less incident light exhibits poorer S/N (Signal-to-Noise ratio). Noise can be classified into random noise and fixed pattern noise (FPN). Since the random noise is not position-dependent, it can be cancelled and reduced by adding a plurality of images.

However, when the plurality of images are added, there is a problem that the added resultant image is blurred due to unsteady hold on the camera or object movement. To overcome this situation, a technique is considered, in which motion vectors are obtained for each of images and the images are added according to their motions, whereby to reduce noise, without having blurring due to unsteady hold on the camera or object movement.

What is problematical in this technique is occlusion and exposure occurring within an image. An occluding area in the image is an area where, e.g., a foreground moves in a manner covering a background, whereas an exposing area is an area where the background reveals from the foreground.

Neither occluding nor exposing areas occur as long as all parts of the image move in the same manner. However, in a scene including a locally different motion, an occluding area and an exposing area occur. In either case of the occluding and exposing areas, when images are added according to their motion vectors, conflicts occur within a resultant image, making the resultant image unnatural.

In one exemplary method, an occluding area and an exposing area are detected by obtaining a standard deviation of luminance in a local area on a frame basis, and then by tracing motion vectors to find any change in standard deviation values, i.e., by checking if there is any such change per frame. This method has been proposed by Ben-Ezra et al.

Also, in another method (see Published Translation of International Patent Application No. 2005-517251, Patent Document 1), three areas, namely, an occluding area, a non-occluding area, and an emerging area, are defined by using preceding and succeeding frames, and the occluding area is interpolated from a frame that is one frame earlier, and the emerging area is interpolated from a frame that is one frame later.

SUMMARY OF THE INVENTION

However, in the Ben-Ezra et al. method of detecting an occluding area and an exposing area, a portion where the standard deviation changes is detected, but no criterion is disclosed as to a degree to which such change is required to be determined as the occluding area and the exposing area. Hence, appropriate detection of occluding areas and exposing areas has not always been successful.

Furthermore, in the method of Patent Reference 1, the means for changing temporal directions for interpolation by classifying areas in preceding and succeeding frames has been merely proposed, with no reference made as to the occluding area and the emerging area at the time a plurality of frames are added.

The present invention has been made in view of such circumstances, and particularly intends to allow taken images to be processed more naturally and sharply.

An image processing apparatus according to an embodiment of the present invention includes motion vector extracting means for extracting a motion vector on a pixel basis, from each of a plurality of input images; direct motion vector generating means for generating a direct motion vector to a pixel on an image for processing from a pixel on each of the plurality of input images, on the basis of motion vectors extracted by the motion vector extracting means; and synthesizing means for synthesizing the plurality of input images by using a pixel value of the pixel on each of the plurality of input images, on the basis of the direct motion vector generated by the direct motion vector generating means.

The synthesizing means may be configured to synthesize the plurality of input images by superposing the pixel value of the pixel on each of the plurality of input images on a pixel value of the pixel on the image for processing, on the basis of the direct motion vector generated by the direct motion vector generating means.

The motion vector generating means may be configured to include occluding area detecting means for detecting an occluding area in each of the plurality of input images, on the basis of the motion vectors extracted by the motion vector extracting means; exposing area detecting means for detecting an exposing area in each of the plurality of input images, on the basis of the motion vectors extracted by the motion vector extracting means; and calculating means for calculating the direct motion vector out of the occluding area in consideration of the exposing area, and the direct motion vector of the occluding area, by using the motion vectors extracted by the motion vector extracting means, on the basis of information about the occluding area detected by the occluding area detecting means and information about the exposing area detected by the exposing area detecting means.

The exposing area detecting means may be configured to detect as the exposing area, a pixel whose terminal point of a motion vector does not exist on a past image, among pixels on a current image, on the basis of the motion vectors extracted by the motion vector extracting means.

The exposing area detecting means may be configured to include plot map generating means for generating, on an image basis, a plot map in which a frame number of the image is assigned into the pixel detected as the exposing area; and exposing area occlusion distance map generating means for generating an exposing area occlusion distance map into which an exposure-starting frame number is assigned, for each pixel on the current image, by synthesizing one plot map corresponding to a past image into another.

Among pixels of a past image indicated by motion vectors of reverse-time direction of pixels of a current image, the occluding area detecting means may be configured to detect a pixel which is set as a terminal point of at least two or more motion vectors of a past image, as the occluding area.

The occluding area detecting means may be configured to further include occlusion map generating means for generating an occlusion map in which the pixel detected as the occluding area is plotted.

An image processing method according to an embodiment of the present invention includes a motion vector extracting step of extracting a motion vector on a pixel basis, from each of a plurality of input images; a direct motion vector generating step of generating a direct motion vector to a pixel on an image for processing from a pixel on each of the plurality of input images, on the basis of motion vectors extracted by processing of the motion vector extracting step; and a synthesizing step of synthesizing the plurality of input images by using a pixel value of the pixel on each of the plurality of input images, on the basis of the direct motion vector generated by processing of the direct motion vector generating step.

A program according to an embodiment of the present invention causes a computer to execute processing including a motion vector extracting step of extracting a motion vector on a pixel basis, from each of a plurality of input images; a direct motion vector generating step of generating a direct motion vector to a pixel on an image for processing from a pixel on each of the plurality of input images, on the basis of motion vectors extracted by processing of the motion vector extracting step; and a synthesizing step of synthesizing the plurality of input images by using a pixel value of the pixel on each of the plurality of input images, on the basis of the direct motion vector generated by the direct motion vector generating step.

In yet another embodiment, the present invention provides a program storage medium in which the above-mentioned program is stored.

In the image processing apparatus and method, and the program according to the embodiments of the present invention, a motion vector is extracted on a pixel basis from each of a plurality of input images, and a direct motion vector is generated to a pixel on an image for processing from a pixel on each of the plurality of input images, on the basis of motion vectors extracted. Then, the plurality of input images are synthesized by using a pixel value of the pixel on each of the plurality of input images, on the basis of the direct motion vector.

The image processing apparatus according to the embodiments of the present invention may be an independent apparatus or a block that performs image processing.

DESCRIPTION OF THE EMBODIMENT

Figure 1:
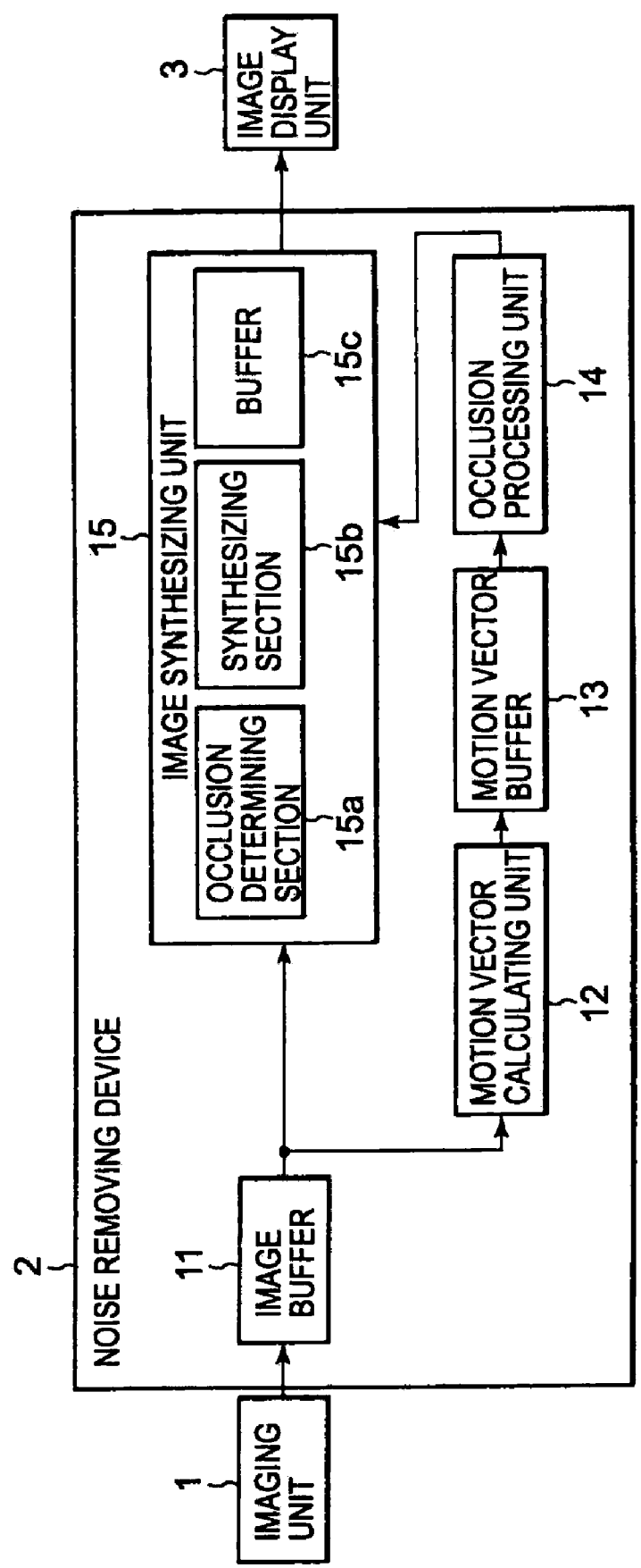
FIG. 1 is a block diagram showing a configuration example of an embodiment of an image processing system to which the present invention is applied.

An embodiment of the present invention will be described below. Relation between the invention and the embodiments thereof in the present specification can be exemplified as follows. This description is to confirm that the embodiment supporting the invention is described in the present specification. Therefore, even if there is any embodiment which is described in the embodiment of the invention but not described as corresponding to the invention, this does not mean that the embodiment does not correspond to the invention. Conversely, even if any embodiment is described as corresponding to the invention, this does not mean that the embodiment does not correspond to any invention other than the invention.

Furthermore, this description does not mean all inventions described in the present specification. In other words, this description does not deny the presence of any invention described in the present specification but not claimed in this application, i.e., the presence of any invention that will be claimed in a divisional application, or that will appear or will be added by an amendment in the future.

Namely, an image processing apparatus according to an embodiment of the present invention includes motion vector extracting means (e.g., a motion vector calculating unit 12 of FIG. 1) for extracting a motion vector on a pixel basis, from each of a plurality of input images; direct motion vector generating means (e.g., an occlusion processing unit 14 of FIG. 1) for generating a direct motion vector to a pixel on an image for processing from a pixel on each of the plurality of input images, on the basis of motion vectors extracted by the motion vector extracting means; and synthesizing means (e.g., an image synthesizing unit 15 of FIG. 1) for synthesizing the plurality of input images by using a pixel value of the pixel on each of the plurality of input images, on the basis of the direct motion vector generated by the direct motion vector generating means.

The synthesizing means (e.g., the image synthesizing unit 15 of FIG. 1) may be configured to synthesize the plurality of input images by superposing the pixel value of the pixel on each of the plurality of input images on a pixel value of the pixel on the image for processing, on the basis of the direct motion vector generated by the direct motion vector generating means.

The motion vector generating means (e.g., the occlusion processing unit 14 of FIG. 1) may be configured to include occluding area detecting means (e.g., an occlusion detecting section 31 of FIG. 2) for detecting an occluding area in each of the plurality of input images, on the basis of the motion vectors extracted by the motion vector extracting means; exposing area detecting means (e.g., an exposure detecting section 32 of FIG. 2) for detecting an exposing area in each of the plurality of input images, on the basis of the motion vectors extracted by the motion vector extracting means; and calculating means (e.g., the occlusion processing unit 14 of FIG. 2) for calculating the direct motion vector out of the occluding area in consideration of the exposing area, and the direct motion vector of the occluding area, by using motion vectors extracted by the motion vector extracting means, on the basis of information about the occluding area detected by the occluding area detecting means and information about the exposing area detected by the exposing area detecting means.

The exposing area detecting means (e.g., the exposure detecting section 32 of FIG. 2) may be configured to detect a pixel among pixels on a current image whose terminal point of a motion vector does not exist on a past image, as the exposing area, on the basis of the motion vectors extracted by the motion vector extracting means.

The exposing area detecting means (e.g., the exposure detecting section 32 of FIG. 2) may be configured to include plot map generating means (e.g., a plot map generating section 91 of FIG. 11) for generating, on an image basis, a plot map in which a frame number of the image is assigned into the pixel detected as the exposing area, and exposing area occlusion distance map generating means (e.g., an occlusion distance map generating section 95 of FIG. 11) for generating an exposing area occlusion distance map into which an exposure-starting frame number is assigned, for each pixel on the current image, by synthesizing one plot map corresponding to a past image into another.

Among pixels of a past image indicated by motion vectors on reverse-time direction of pixels in a current image, the occluding area detecting means (e.g., the occlusion detecting section 31 of FIG. 2) may be configured to detect a pixel which is set as a terminal point of at least two or more motion vectors at pixels on a past image as the occluding area.

The occluding area detecting means (e.g., the occlusion detecting section 31 of FIG. 2) can be configured to further include occlusion map generating means (e.g., an occlusion map managing section 62 in FIG. 10) for generating an occlusion map in which the pixel detected as the occluding area is plotted.

An image processing method and a program according to the embodiments of the present invention include a motion vector extracting step (e.g., step S3 of FIG. 13) of extracting a motion vector on a pixel basis, from each of a plurality of input images; a direct motion vector generating step (e.g., step S5 of FIG. 13) of generating a direct motion vector to a pixel on an image for processing from a pixel on each of the plurality of input images, on the basis of motion vectors extracted in the motion vector extracting step; and a synthesizing step (e.g., step S6 of FIG. 13) of synthesizing the plurality of input images by using a pixel value of the pixel on each of the plurality of input images, on the basis of the direct motion vector generated in the direct motion vector generating step.

Referring to FIG. 1, the configuration of an image processing system to which the present invention is applied will be described.

FIG. 1 is a block diagram showing a configuration example of an image processing system that synthesizes a plurality of input images to realize noise reduction (remove noise in the images).

The image processing system includes an imaging unit 1, a noise removing device 2, and an image display unit 3. The noise removing device 2 synthesizes a plurality of images captured by the imaging unit 1 to remove noise from the images, and outputs the noise-removed images to the image display unit 3 for display.

An image buffer 11 temporarily accumulates images generated by the imaging unit 1 formed of imaging devices, such as a Charge Coupled Device (CCD) or Complementary Metal-Oxide Semiconductor (CMOS) sensor, as an image array, and supplies the images to a motion vector calculating unit 12 and an image synthesizing unit 15.

The motion vector calculating unit 12 obtains, as to each of the images accumulated in the image buffer 11, a motion vector on a pixel basis by block matching, a gradient method, or the like, and stores the obtained motion vector in a motion vector buffer 13.

An occlusion processing unit 14 generates a direct motion vector that indicates direct correspondence between a pixel on an image for processing and a pixel on each of a plurality of images used for noise removal, considering motion vectors at pixels belonging to an occluding area or an exposing area among motion vectors in which occlusion is occurring, on the basis of motion vectors stored in the motion vector buffer 13, and supplies the generated direct motion vector to the image synthesizing unit 15.

The image synthesizing unit 15 includes an occlusion determining section 15a, a synthesizing section 15b, and a buffer 15c. The unit 15 generates a synthesized image using direct motion vectors (including occluding portion direct motion vectors) supplied thereto from the occlusion processing unit 14 and the plurality of images accumulated in the image buffer 11, and outputs The image thus synthesized to the image display unit 3, such as a CRT (Cathode Ray Tube) or an LCD (Liquid Crystal Display), for display.

Figure 2:
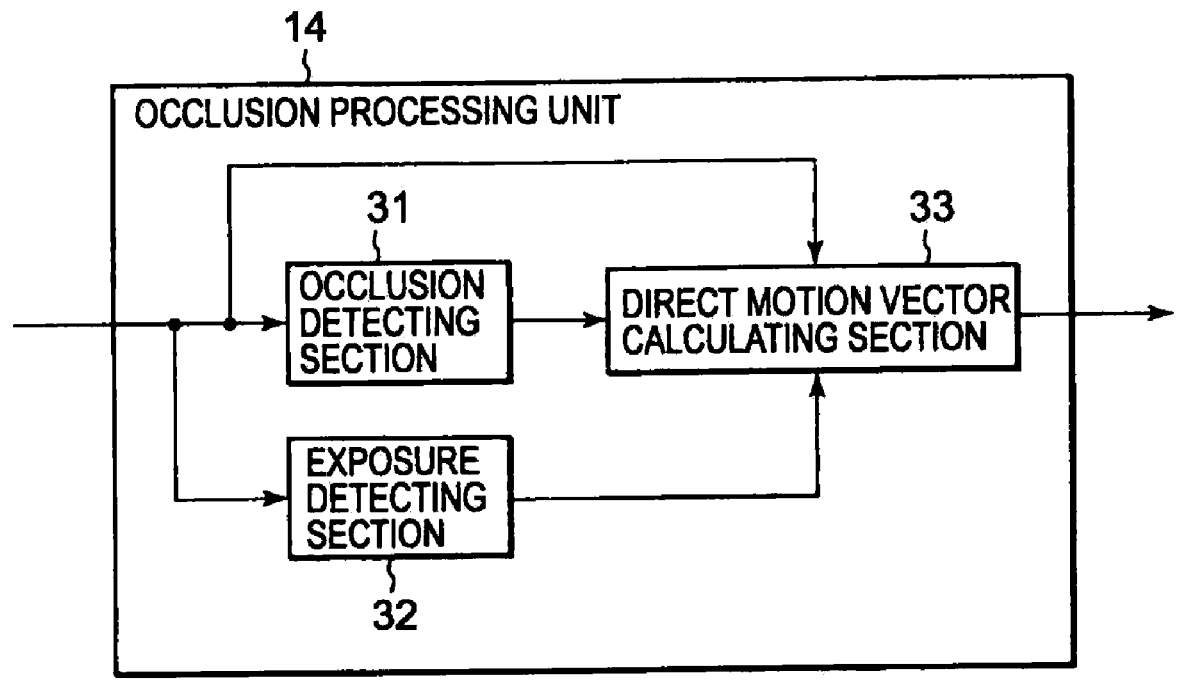
FIG. 2 is a block diagram illustrating a configuration example of an occlusion processing unit of FIG. 1.

Referring next to FIG. 2, a configuration example of the occlusion processing unit 14 will be described. The occlusion processing unit 14 includes an occlusion detecting section 31, an exposure detecting section 32, and a direct motion vector calculating section 33.

The occlusion detecting section 31 plots pixels as an occluding area on a pixel basis in each image accumulated in the image buffer 11, on the basis of motion vectors stored in the motion vector buffer 13, to generate an occlusion map.

The exposure detecting section 32 generates an occlusion distance map that indicates the frame number of an image in which an exposing area occurred and any pixel position as the exposing area on that image, on the basis of motion vectors stored in the motion vector buffer 13.

The direct motion vector calculating section 33 calculates a direct motion vector that indicates a motion vector from a past image, which is usable on a frame basis, on the basis of motion vectors stored in the motion vector buffer 13, occlusion maps, and occlusion distance maps, and outputs the calculated direct motion vector to the image synthesizing unit 15.

Figure 3:
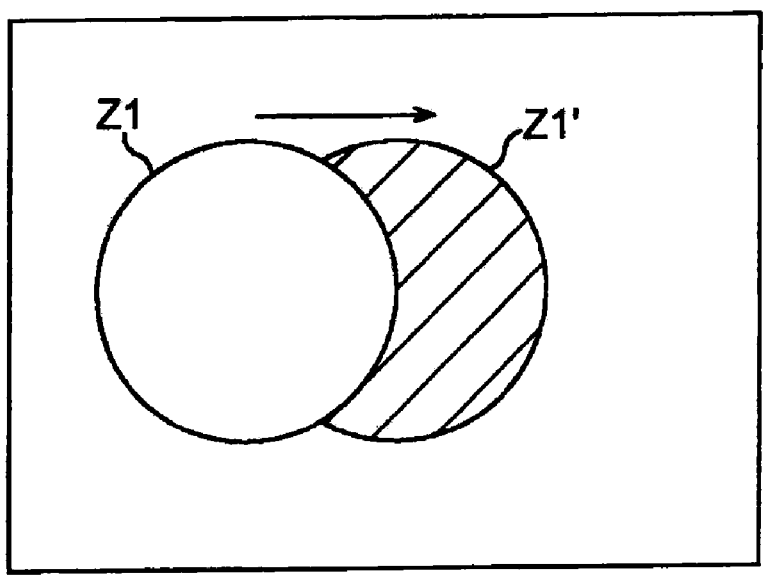
FIG. 3 is a diagram illustrating an occluding area.

Here, concepts of an occluding area and an exposing area will be described. Referring first to FIG. 3, the concept of all occluding area will be described.

The occlusion detecting section 31 detects or extracts an area being any pixel which is among pixels on a current image, i.e., a reference image for executing noise removal, and to which a plurality of pixels on an past image are indicated, as an occluding area. Namely, an occluding area occurs when the motion of a pixel in a specific area within an image is different from the motion of a pixel in the other area of the image and when the specific pixel area exhibits a motion such that it overlaps with the pixel area in the other area. In other words, the pixel in the occluding area is an area of a pixel to be a terminal point of motion vector in a time direction viewed from both a foreground pixel and a background pixel. Namely, in FIG. 3, a shaded portion Z1' is an occluding area for occluding a background area, as a foreground area of a white portion Z1 moves to right direction.

Figure 4:
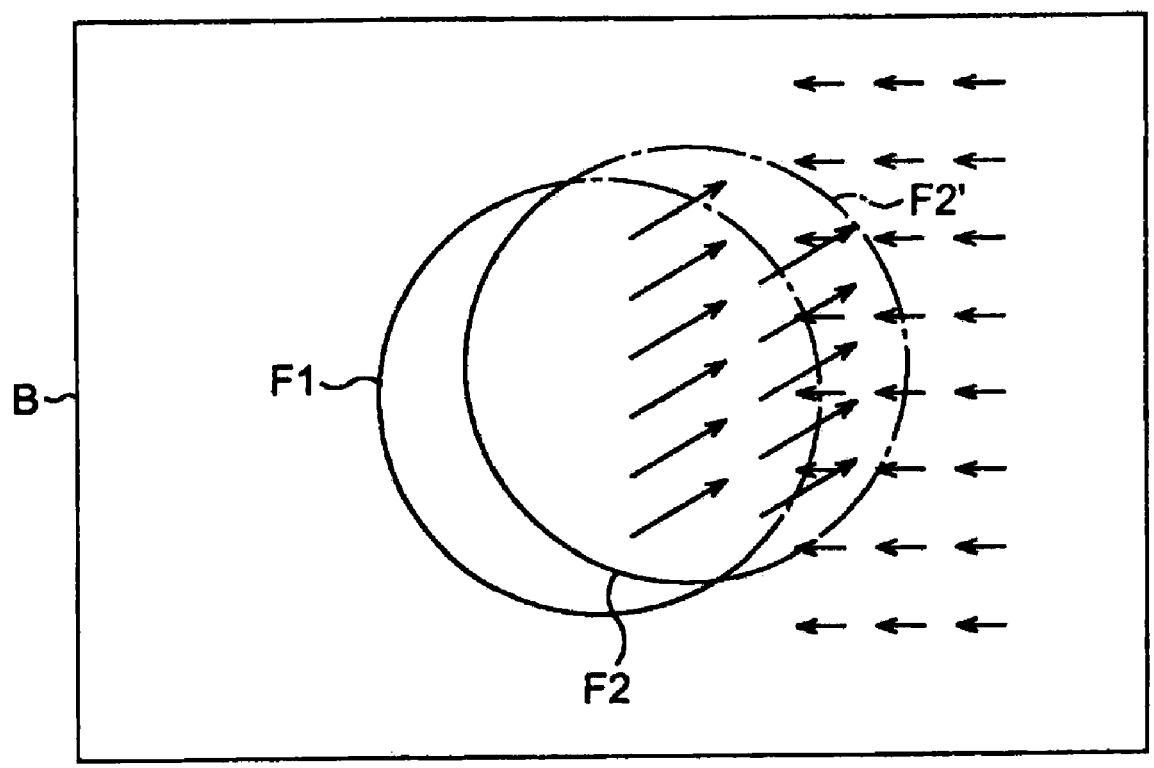
FIG. 4 is a diagram illustrating an occluding area.

More specifically, as shown in FIG. 4, when a foreground motion is different from a background motion, an occluding area occurs. In FIG. 4, a background B indicated by a white portion in the figure moves to left, and a foreground F1 being a circular image moves diagonally to the upper right as expressed by a foreground F2, whereby both pixels forming the background B and pixels forming the foreground F2 exhibit a motion such that they move to the same pixel positions in a crescent area F2' defined by an alternate-long-and-short-dash line. As a result, the crescent area can be said to be an area formed of a set of pixels designated as the terminal points at which a plurality of motion vectors are directed. By extracting the pixels being the terminal points of such motion vectors in a plurality of pixels, an occluding area can be detected.

Figure 5:
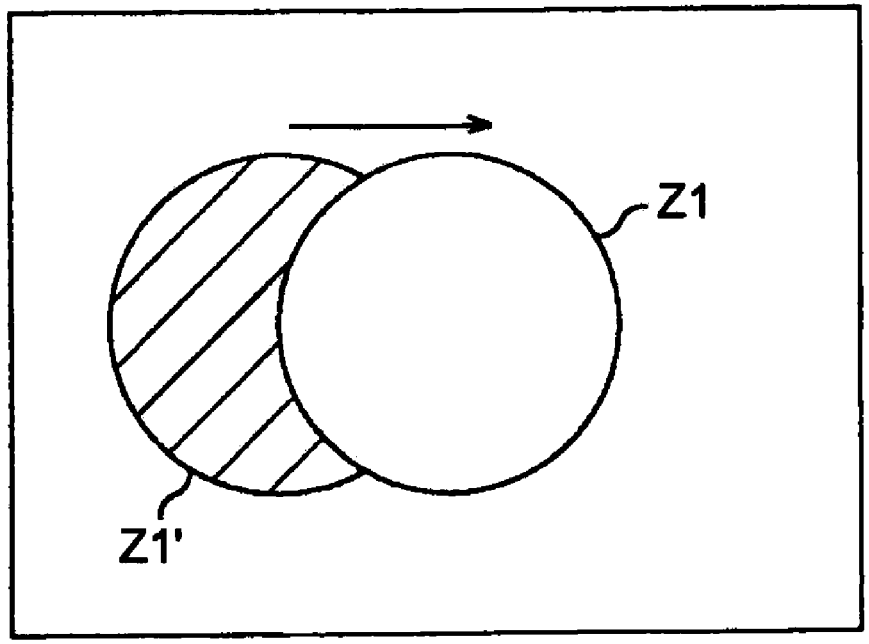
FIG. 5 is a diagram illustrating an exposing area.

Referring next to FIG. 5, the concept of an exposing area will be described. A shaded portion Z1' in FIG. 5 is an exposing area occurring due to a white portion Z1 being a circle moving to right. The exposure detecting section 32 generates a plot map by detecting an exposing area in each image, and also generates an occlusion distance map that indicates where in a sequence of the frame numbers of past images the exposure was first detected, using plot maps respectively corresponding to the past images.

Figure 6:
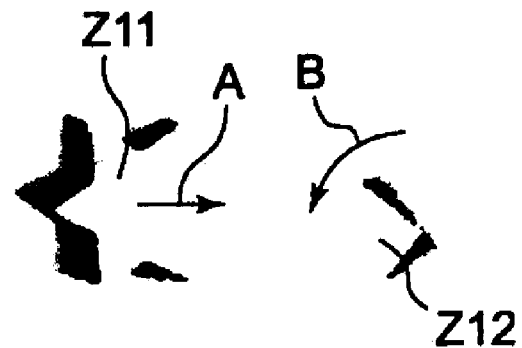
FIG. 6 is a diagram illustrating an example of an occlusion distance map.

The occlusion distance map can be represented in a visible way as shown in FIG. 6. In this example, a star-shaped area is moving in directions indicated by arrows and then, a square area is moving by rotation in directions indicated by arrows. An exposing area occlusion distance map is a gray-scale image indicating exposing areas, and an exposing frame number may be learned by a luminance value. In FIG. 6, exposing areas occurring when the star-shaped foreground image Z11 is moving to left as indicated by an arrow A on the left of the figure and when the square foreground image Z12 is moving in a counterclockwise direction as shown by an arrow B on the right of the figure, are represented by changing luminance values on an exposure-starting frame basis. Namely, the luminance values vary from one area to another, and thus the closer a pixel is to the shape, the closer to a timing (an image having an exposure-starting frame number) at which the pixel started exposing.

Figure 7:
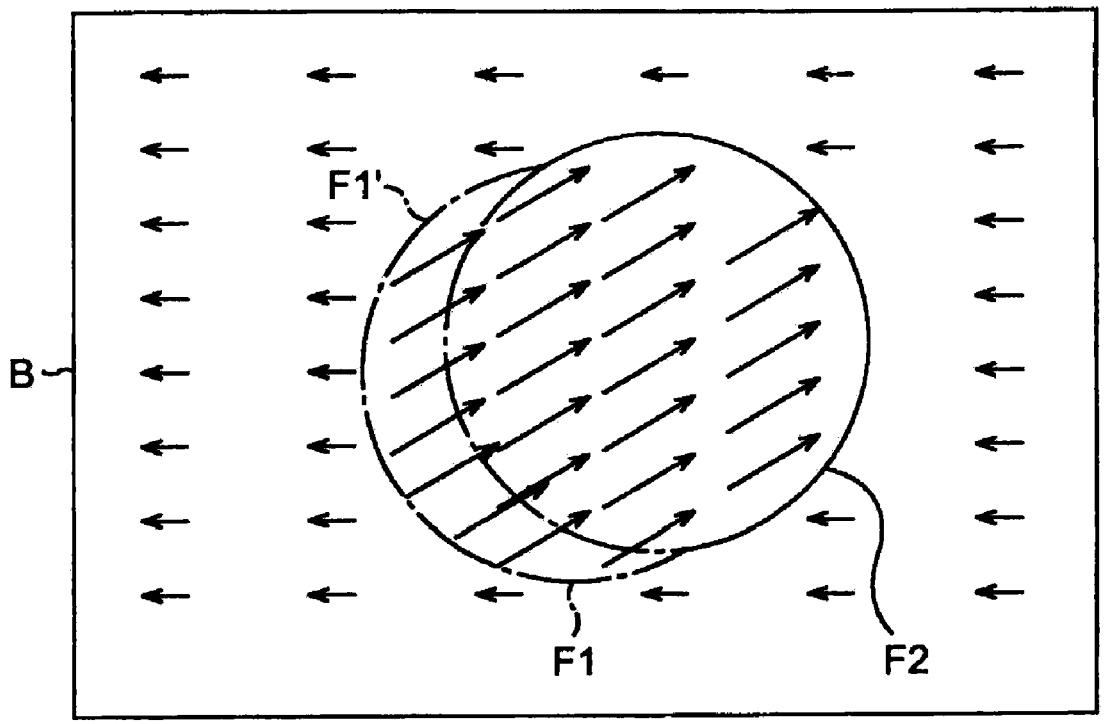
FIG. 7 is a diagram illustrating an exposing area.

More specifically, the plot map is a map plotting any pixel being the terminal point of a pixel-based motion vector on each image. This plot map is created in order of time sequence. When an exposing area occurs, there appears an area being a pixel not designated as the terminal point of the motion vector at any pixel on a past image. Namely, as shown in FIG. 7, when a background B moves to left in the figure, and when a foreground F1 moves diagonally to the upper right, the majority of pixels in the background B is set as the terminal points of the motion vectors at pixels on a past image (previous frame). However, a crescent area F1' indicated by an alternate-long-and-short-dash line in the figure is a region formed of pixels not set as the terminal points of the motion vectors at the pixels on the past image. Namely, the crescent area F1' indicated by the alternate-long-and-short-dash line is an exposing area formed of the pixels not set, from the old frame, as the terminal points of the motion vectors at the pixels on the past image.

Exposing areas vary for each image (for each frame) Thus, if an image is generated whose pixel value is associated with the frame number at which exposure started, the pixel value on the current image can specify where in a sequence of old frames the area started exposing.

Thus, let a map, in which any pixel detected per image as an exposing area is plotted with a frame number of that image, be called a plot map. However, the plot map is obtained through processing for simply checking whether or not any pixel is set as the terminal point of a motion vector, and thus requires discrete calculation of an area. Hence, during the calculation, sampling noise may occur. To overcome this situation, in generating a plot map, isolated-area-removing processing is performed per each pixel to remove calculation-derived noise. For this isolated-area-removing processing, median processing may be performed.

An occlusion distance map is generated from plot maps in a plurality of images. Namely, a plot map is information indicating an exposing area on an image basis, whereas an occlusion distance map indicates where in a sequence of the frame numbers of past images a-pixel-based area on the current image started exposing.

Figure 8:
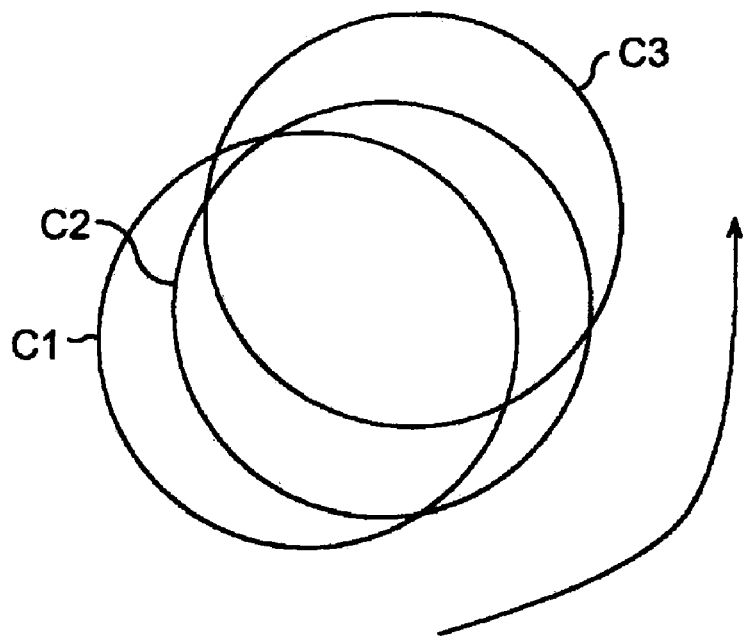
FIG. 8 is a diagram illustrating a plot map.
Figure 9:
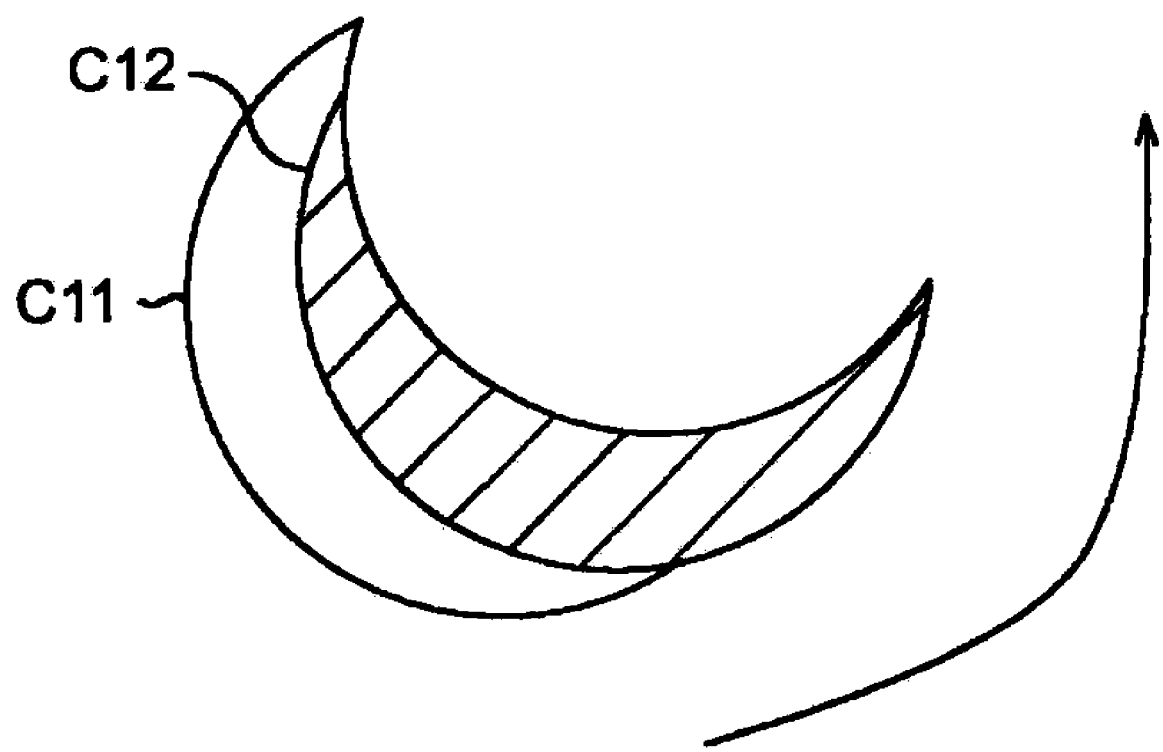
FIG. 9 is a diagram illustrating an occlusion distance map.

For example, supposing that a circular foreground image moves from the lower left to the upper right on an image basis (on a frame basis) from a state C1 to a state C3, as shown in FIG. 8, an exposing area moves as shown in the figure. Therefore, an exposing area between adjacent images (adjacent frames) is overwritten in a new exposing area in a new image. And by setting a luminance so as to correspond to an exposure-starting frame number, on an area basis, an occlusion distance map such as shown in FIG. 9 is generated. Namely, in FIG. 9, an exposing area C11 that occurs during change from the states C1 to C2 is represented as being crescent, and an exposing area C12 that occurs during change from the states C2 to C3 is represented as being crescent as well.

Figure 10:
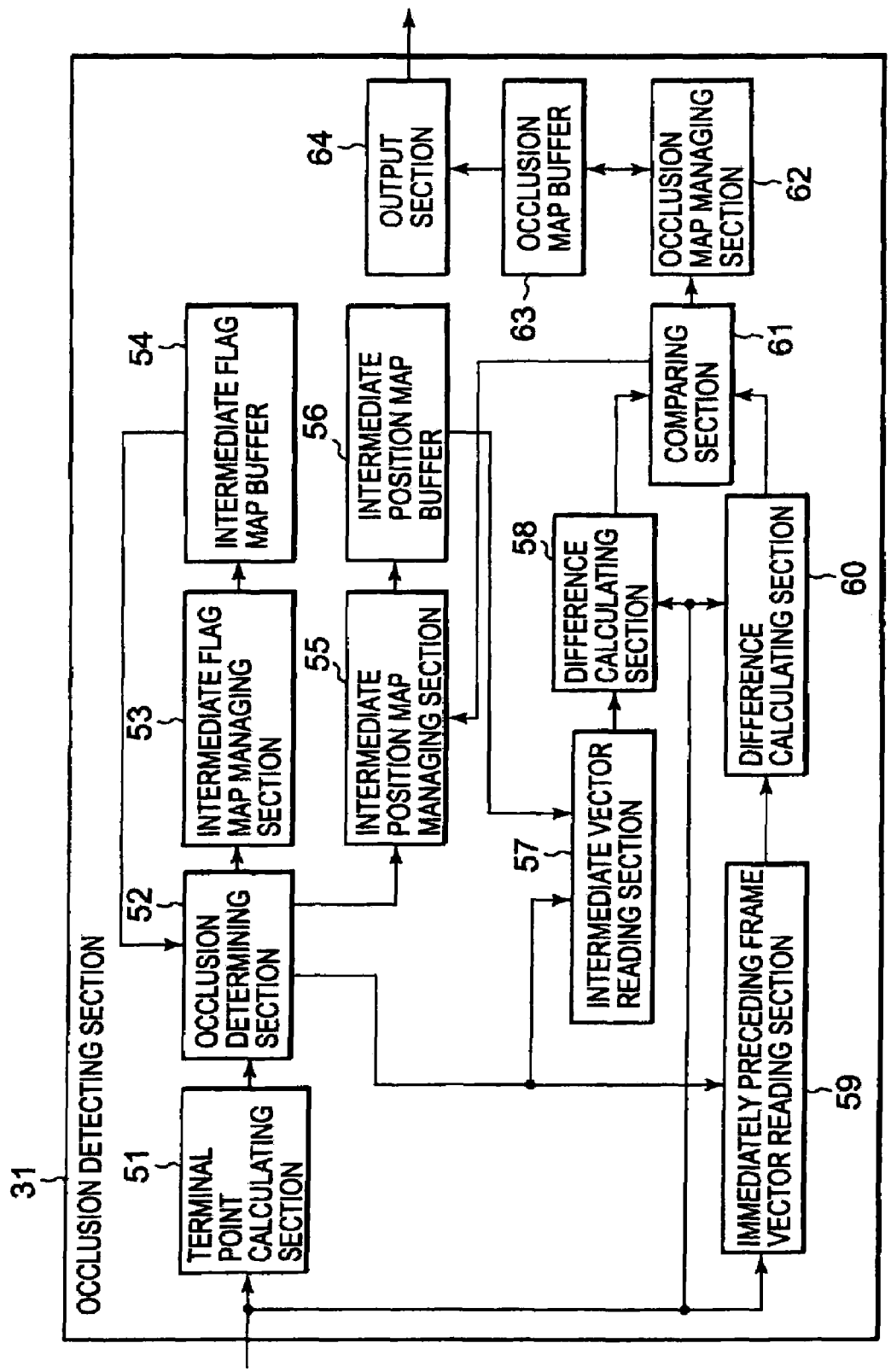
FIG. 10 is a block diagram illustrating a configuration example of an occlusion detecting section of FIG. 2.

Referring next to FIG. 10, a detailed configuration example of the occlusion detecting section 31 will be described.

A terminal point calculating section 51 calculates a pixel being the terminal point of a motion vector at each of pixels on an image (current image) for processing, and supplies the calculation result to an occlusion determining section 52. The occlusion determining section 52 compares the terminal position information about the motion vector at each pixel with information in an intermediate flag map buffer 54 to determine whether or not that pixel is designated as the terminal position from any other pixel. Thereafter, the occlusion determining section 52 supplies the information (pixel information) about the pixel for processing together with the determination result to an intermediate flag map managing section 53, an intermediate position map managing section 55, an intermediate vector reading section 57, and an immediately preceding frame vector reading section 59. The intermediate flag map managing section 53 manages the intermediate flag map buffer 54 that stores a flag indicating whether or not that pixel is set by any other pixel as the terminal position of the motion vector of such other pixel, on the basis of the determination result and the pixel information from the occlusion determining section 52.

The intermediate position map managing section 55 manages an intermediate position map buffer 56 that accumulates intermediate position maps for accumulating pixels set as the terminal positions of motion vectors, on the basis of the determination result and the pixel information from the occlusion determining section 52 or of a comparison result from a comparing section 61.

The intermediate vector reading section 57 reads out intermediate position map information in the intermediate position map buffer 56 as an intermediate vector, on the basis of the determination result and the pixel information from the occlusion determining section 52 and supplies read information to a difference calculating section 58. The difference calculating section 58 calculates a difference between a current motion vector stored in the motion vector buffer 13 and the intermediate vector, and supplies the calculation result to the comparing section 61.

The immediately preceding frame vector reading section 59 reads, from the motion vector buffer 13, information about a motion vector at the same pixel position on an image being the immediately preceding frame, on the basis of the determination result and the pixel information from the occlusion determining section 52, and supplies read information to a difference calculating section 60. The difference calculating section 60 calculates a difference between the current motion vector stored in the motion vector buffer 13 and the motion vector at the same pixel position on the image being an immediately preceding frame, and supplies the calculation result to the comparing section 61.

The comparing section 61 compares the differences between the difference calculating sections 58 and 60, and supplies terminal pixel information about the motion vector at the pixel for processing, to an occlusion map managing section 62 and the intermediate position map managing section 55, together with the comparison result.

The occlusion map managing section 62 manages occlusion maps stored in an occlusion map buffer 63, on the basis of the comparison result from the comparing section 61 and the terminal pixel information about the motion vector at the pixel for processing. An output section 64 reads occlusion maps stored in the occlusion map buffer 63 and outputs read information to the direct motion vector calculating section 33.

Figure 11:
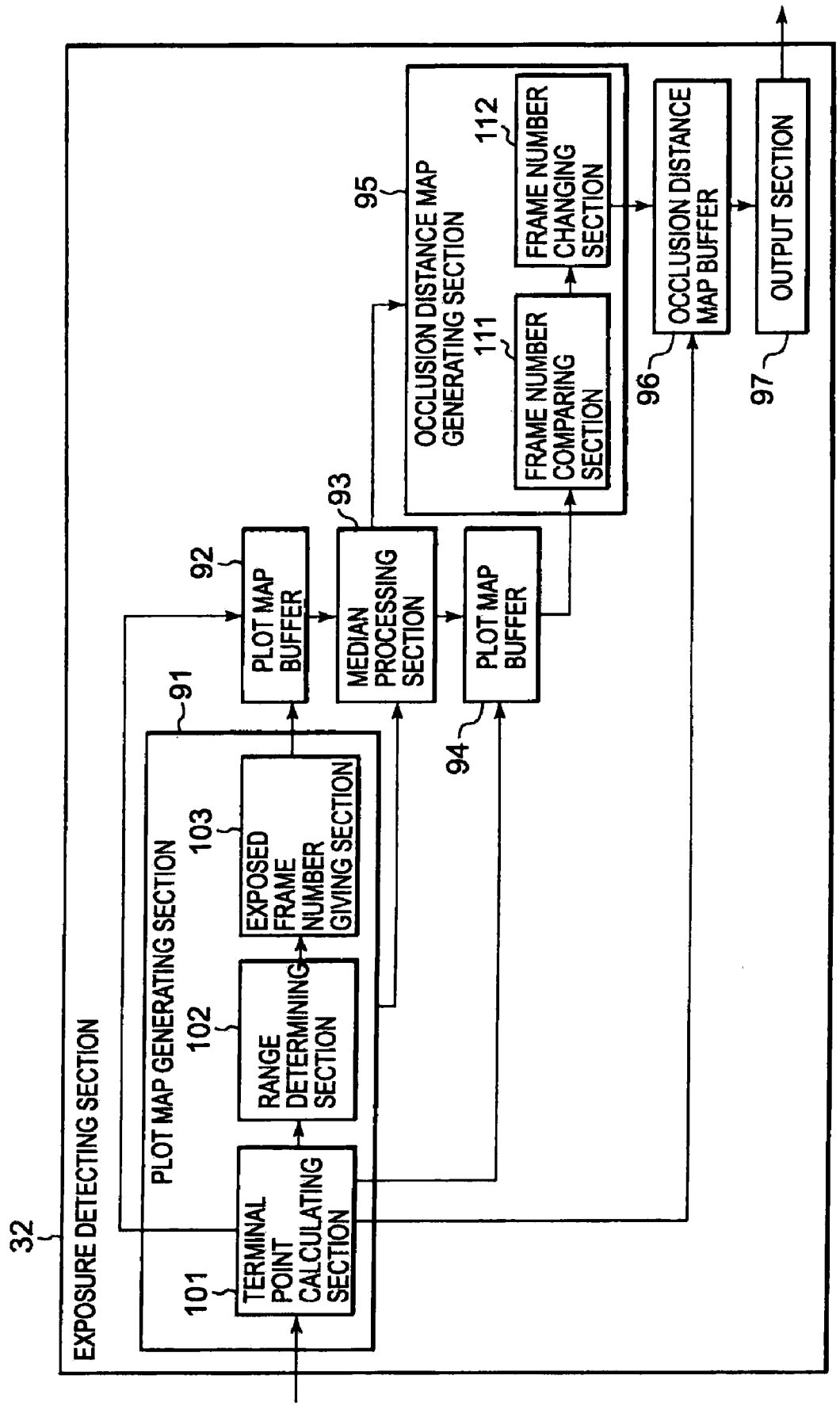
FIG. 11 is a block diagram illustrating a configuration example of an exposure detecting section of FIG. 2.

Referring next to FIG. 11, a detailed configuration of the exposure detecting sect on 32 will be described.

A plot map generating section 91 includes a terminal point calculating section 101, a range determining section 102, and an exposing frame number adding section 103, and generates plot maps for storage in a plot map buffer 92.

The terminal point calculating section 101 calculates the terminal position of a motion vector at each pixel on an image for processing, for supply to the range determining section 102. In this case, the terminal point calculating section 101 supplies the calculation result including also information about a frame number from which the motion vector is extracted, to the range determining section 102.

The range determining section 102 determines whether or not the terminal position of the motion vector supplied thereto is within a range with respect to the image, and only if so, supplies the terminal position information and the frame number information to the exposing frame number adding section 103.

The exposing frame number adding section 103 adds the frame number information to the terminal position information about the motion vector supplied thereto, and causes the plot map buffer 92 to store the resultant information therein as a plot map.

A median processing section 93 performs the median processing in order to remove isolated points in plot map information stored in the plot map buffer 92, and stores the resultant plot map in a plot map buffer 94.

An occlusion distance map generating section 95 includes a frame number comparing section 111 and a frame number changing section 112, and generates an occlusion distance map on the basis of information of image-based plot maps stored in the plot map buffer 94, for storage in an occlusion distance map buffer 96. The frame number comparing section 111 compares frame numbers stored in each image-based plot map, as to each pixel on the image for processing, and supplies the pixel position and frame number information to the frame number changing section 112, together with the comparison result. The frame number changing section 112 updates its frame number information by associating therewith the pixel position, in accordance with the comparison result supplied by a frame number comparing section 111 and performs additional processing, to generate an occlusion distance map for storage in the occlusion distance map buffer 96.

An output section 97 reads an occlusion distance map stored in the occlusion distance map buffer 96, for supply to the direct motion vector calculating section 33.

Figure 12:
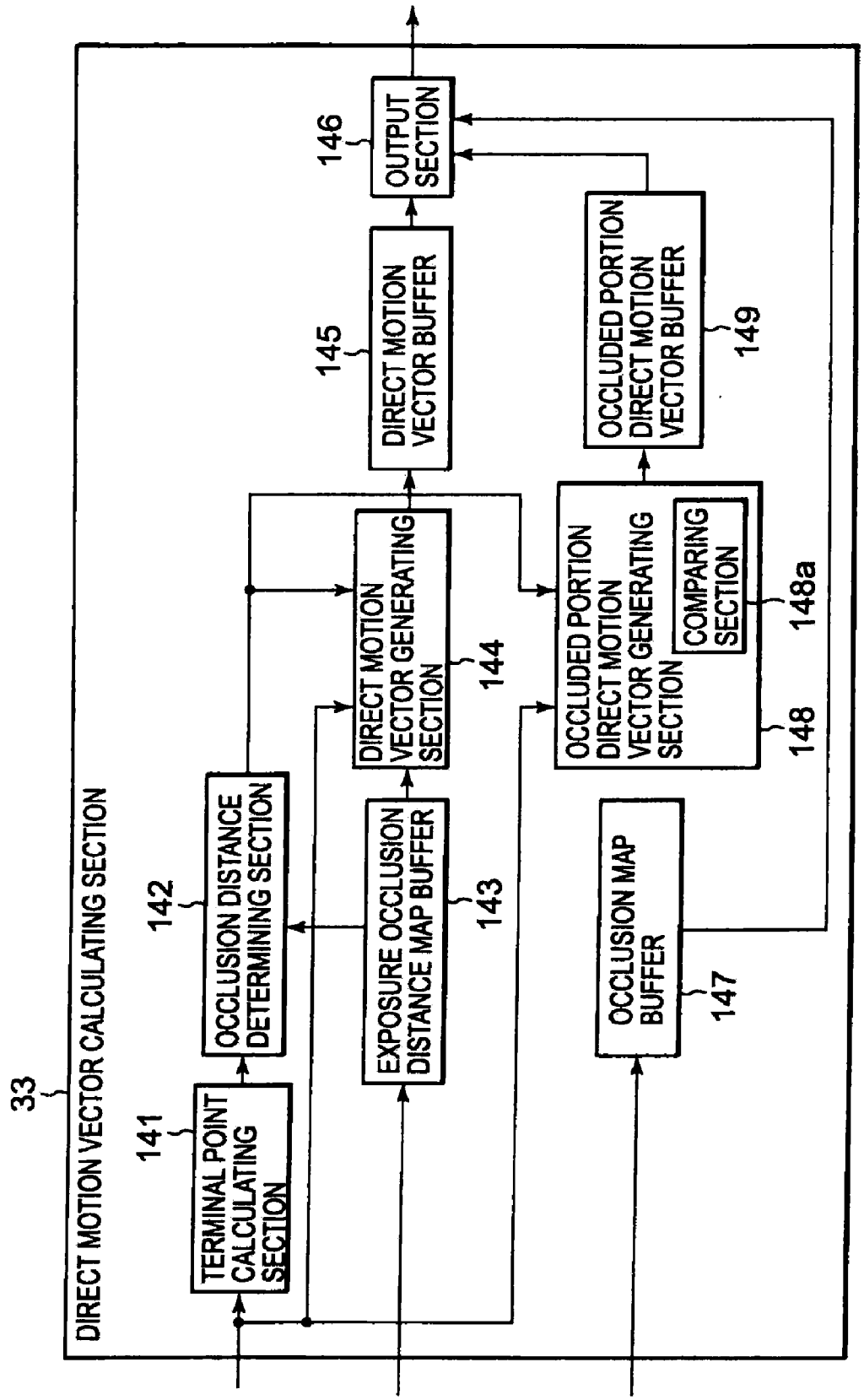
FIG. 12 is a block diagram illustrating a configuration example of a direct motion vector calculating section of FIG. 2.

Referring next to FIG. 12, a detailed configuration of the direct motion vector calculating section 33 will be described.

A terminal point calculating section 141 calculates terminal position information about the motion vector at each of pixels on the image for processing, and supplies the calculation result to an occlusion distance determining section 142, a direct motion vector generating section 144, and an occluding portion direct motion vector generating section 148.

The occlusion distance determining section 142 determines whether or not the frame number associated with a pixel at the terminal position is smaller than the current frame number on the basis of occlusion distance maps stored in an occlusion distance map buffer 143, and supplies the determination result to the direct motion vector generating section 144 and the occluding portion direct motion vector generating section 148.

The occlusion distance map buffer 143 stores occlusion distance maps supplied thereto from the exposure detecting section 32.

The direct motion vector generating section 144 generates a direct motion vector considering an exposing area, on the basis of the determination result supplied thereto from the occlusion distance determining section 142, for storage in a direct motion vector buffer 145.

An occlusion map buffer 147 stores occlusion maps supplied thereto from the occlusion detecting section 31.

The occluding portion direct motion vector generating section 148 generates an occluding portion direct motion vector considering an occluding area, on the basis of the determination result supplied thereto from the occlusion distance determining section 142, for storage in an occluding portion direct motion vector buffer 149.

An output section 146 outputs direct motion vectors stored in the direct motion vector buffer 145, occluding portion direct motion vectors stored in the occluding portion direct motion vector buffer 149, and occlusion maps stored in the occlusion map buffer 147, to the image synthesizing unit 15 by association with one another.

Figure 13:
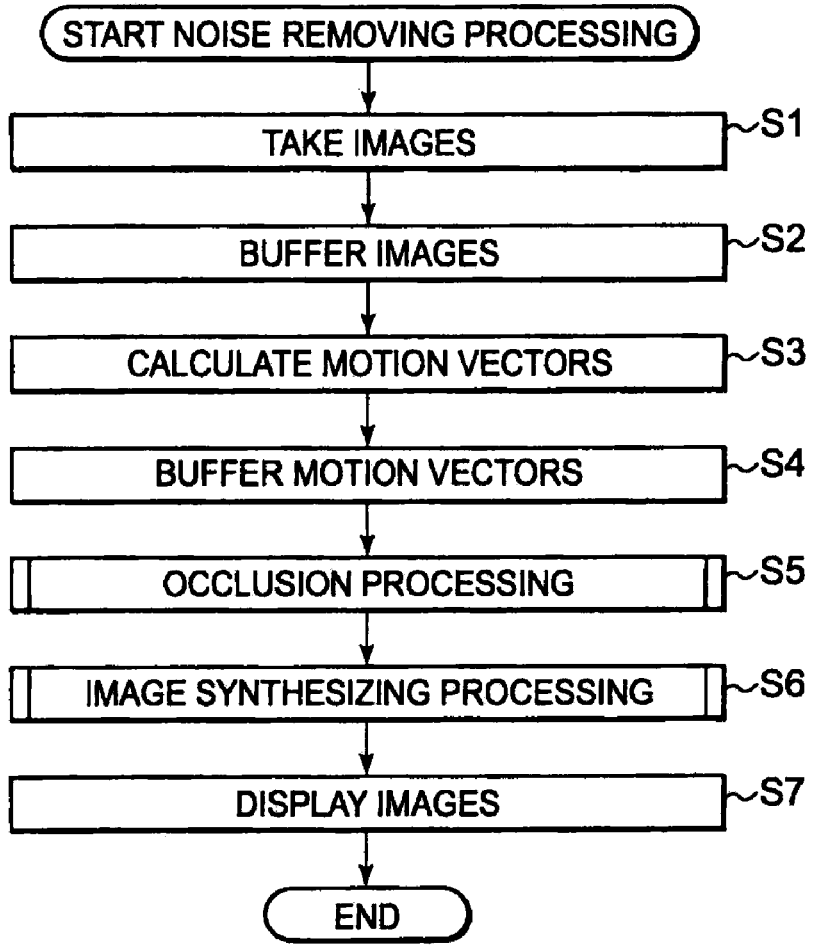
FIG. 13 is a flowchart for illustrating noise removing processing.

Referring next to a flowchart of FIG. 13, noise removing processing by the image processing system of FIG. 1 will be described.

In step S1, the imaging unit 1 takes images, and supplies them to the image buffer 11 one after another.

In step S2, the image buffer 11 stores or buffers the images supplied thereto from the imaging unit 1 as a series of image sequence.

In step S3, the motion vector calculating unit 12 obtains motion vectors on a pixel basis from the image array stored in the image buffer 11 by the block matching, the gradient method, or the like, for supply to the motion vector buffer 13. During this operation, the motion vector calculating section 12 supplies the motion vectors to the motion vector buffer 13, by adding, to each of the motion vectors, a frame number for identifying an image on which the calculation is based and coordinate information about the pixel being a starting point of the motion vector.

In step S4, the motion vector buffer 13 stores or buffers the pixel-based motion vectors supplied thereto from the motion vector calculating section 12 in order of the images, by associating, with each of the motion vectors, the frame number for identifying the image on which the calculation is based and the coordinate information about the pixel being the starting point of the motion vector.

In step S5, the occlusion processing unit 14 executes occlusion processing using pixel-based motion vectors each of which is obtained per pixel on each image and which are stored in the motion vector buffer 13, to obtain direct motion vectors and occluding portion direct motion vectors for supply to the image synthesizing unit 15.

Referring here to a flowchart of FIG. 14, the occlusion processing will be described.

In step S21, the exposure detecting section 32 executes exposure detecting processing to detect an exposing area on the basis of motion vectors stored in the motion vector buffer 13, aid also generates an occlusion distance map corresponding to the exposing area, for supply to the direct motion vector calculating section 33. Note that the exposure detecting processing will be described in detail later with reference to a flowchart of FIG. 15.

In step S22, the occlusion detecting section 31 executes occlusion detecting processing to detect an occluding area on the basis of motion vectors stored in the motion vector buffer 13, and also generates an occlusion map corresponding to the occluding area, for supply to the direct motion vector calculating section 33. Note that the occlusion detecting processing will be described in detail later with reference to a flowchart of FIG. 19.

In step S23, the direct motion vector calculating section 33 executes direct motion vector calculating processing to obtain a direct motion vector corresponding to the exposing area and an occluding portion direct motion vector corresponding to the occluding area, on the basis of occlusion distance maps supplied thereto from the exposure detecting section 32, occlusion maps supplied thereto from the occlusion detecting section 31, and motion vectors stored in the motion vector buffer 13, for supply to the image synthesizing unit 15 collectively as direct motion vectors.

As described above, as a result of the occlusion processing, the direct motion vector corresponding to the exposing area and the occluding portion direct motion vector corresponding to the occluding area are obtained, and collected as direct motion vectors for supply to the image synthesizing unit 15.

Figure 15:
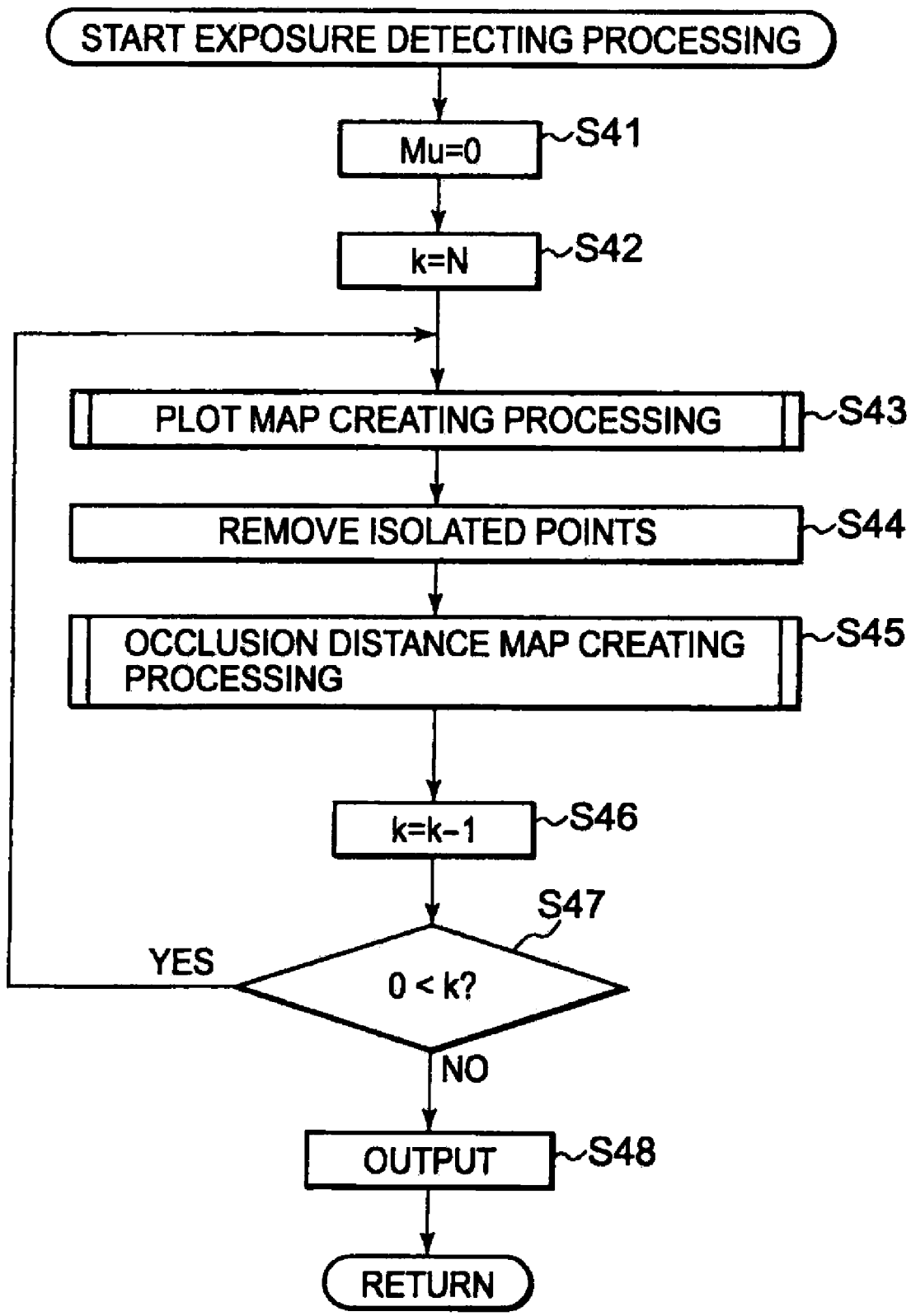
FIG. 15 is a diagram illustrating an exposure detecting processing.

Referring next to the flowchart of FIG. 15, the exposure detecting processing by the exposure detecting section 32 will be described.

In step S41, the terminal point calculating section 101 of the plot map generating section 91 initializes each element of occlusion distance maps Mu in the occlusion distance map buffers 96, respectively, to 0.

In step S42, the terminal point calculating section 101 initializes a frame number counter k, not shown, to N being a starting one of frames for superposition. The frames are supposed to be numbered such that the current frame is numbered 0 and frames immediately preceding thereto are respectively numbered −1, −2 . . . , −k sequentially. Namely, if an image for processing has a frame number 0, the noise removing device 2 performs the exposure detecting processing on images having frame numbers (−N) to 0, in order to remove noise by superposing, on the image whose frame number is 0, N images immediately preceding the image having the frame number 0. That is why the frame number counter k is initialized to N in the first step.

In step S43, plot map creating processing is executed to generate a plot map.

Figure 16:
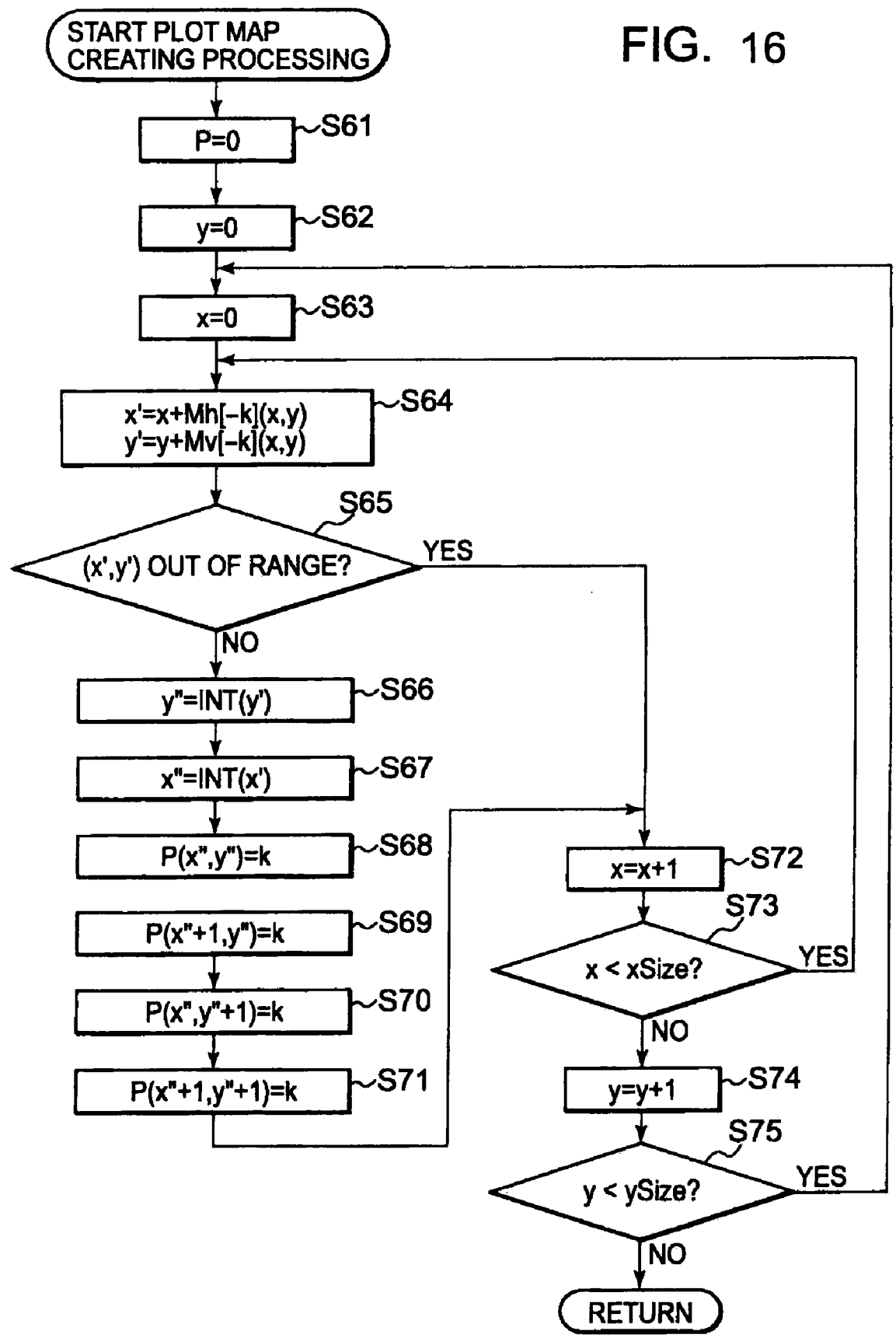
FIG. 16 is a flowchart for illustrating a plot map creating processing.

Referring here to a flowchart of FIG. 16, the plot map creating processing will be described.

In step S61, the terminal point calculating section 101 initializes each element P corresponding to the plot map of an image whose frame number is (−k), to 0.

In step S62, the terminal point calculating section 101 initializes to 0, a not shown counter y which indicates a y-direction value of a pixel on the image whose frame number is (−k) for processing.

In step S63, the terminal point calculating section 101 initializes, to 0, a not shown counter x which indicates a x-direction value of a pixel on the image whose frame number is (−k) for processing.

Figure 17:
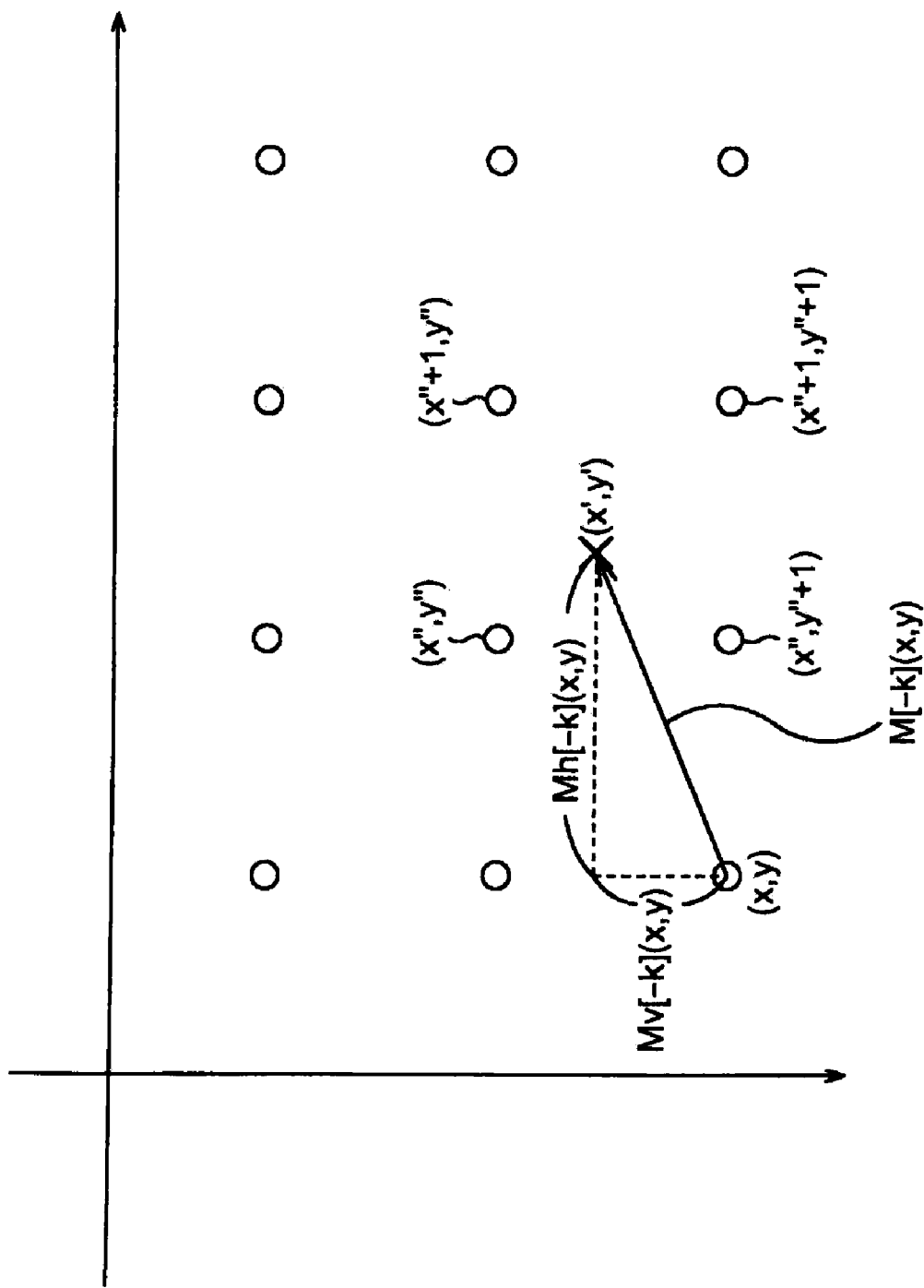
FIG. 17 is a diagram illustrating the plot map creating processing.

In step S64, the terminal point calculating section 101 obtains, as shown in FIG. 17, a terminal position (x',y')=(x+ Mh[−k](x,y), Mv[−k](x,y)) of a motion vector M[−k] (x,y)= (Mh[−k] (x,y), Mv[−k] (x,y)) at a pixel (x,y) on the image whose frame number is (−k) for processing, for supply to the range determining section 102. Note that an open circle in FIG. 17 represents the pixel center.

In step S65, the range determining section 102 judges whether or not the terminal position. (x',y') of the motion vector (Mh[−k](x,y), Mv[−k] (x,y)) at the pixel (x,y) is out of a range of the image whose frame number is (−k). Namely, if an image size is xSize×ySize, whether or not the terminal position (x',y') is 0<x'<xSize or 0<y'<ySize is determined.

If it is determined in step S65, e.g., that the terminal position is not out of the range, i.e., that it is a pixel contained in the image whose frame number is (−k) for processing, the range determining section 102 supplies, in steps S66, S67, information about the terminal position (x', y') to the exposing frame number adding section 103. The exposing frame number adding section 103 obtains maximum integers (INT(x'), INT(y')) not exceeding the real numbers x', y' representing the terminal position, as a near-terminal position pixel position (x",y").

In steps S68 to S71, the exposing frame number adding section 103 sequentially sets plot maps P(x",y"), P(x"+1,y"), P(x",y"+1), P(x"+1,y"+1) to k by each step processing, on the basis of a near-terminal position pixel information, for storage in the plot map buffer 92. Namely, distribution of the terminal positions of motion vectors at the pixels near the terminal position of the motion vector is registered by the frame number (−k).

In step S72, the terminal point calculating section 101 increments the counter x by 1.

In step S73, the terminal point calculating section 101 determines whether or not the counter x is smaller than xSize being a horizontal image size, and if so, the processing returns to step S64. Namely, steps S64 to S73 are repeated until plot maps are obtained for all horizontally extending pixels at y. And if it is determined in step S73 that the counter x is not smaller than xSize, i.e., if it is determined that the processing is completed for a single horizontal row, the processing proceeds to step S74.

In step S74, the terminal point calculating section 101 increments the counter y by 1.

In step S75, the terminal point calculating section 101 determines whether or not the counter y is smaller than ySize being a vertical image size, and if so, the processing returns to step S63. Namely, processing of steps S63 to S75 are repeated until plot maps are obtained for all horizontally extending pixels at y. And if it is determined in step S75 that the counter y is not smaller than ySize, i.e., if it is determined that the processing is completed for all the pixels in both horizontal and vertical directions, the processing ends.

Meanwhile, if it is determined in step S65 that the terminal position is out of the range, the processing proceeds to step S72. Namely, since there is no terminal position, steps S66 to S71 for registering the plot map are skipped.

As a result of the above processing, a plot map is created and stored in the plot map buffer 92.

Returning here to FIG. 15, the description of the flowchart shown therein is continued.

In step S43, when the plot map is created and stored in the plot map buffer 92 by the plot map creating processing, the median processing section 93 reads, in step S44, plot map information associated with peripheral pixels using plot map P information about each pixel position stored in the plot map buffer 92, to remove isolated points by replacement with a median, and store the resultant plot map in the plot map buffer 94.

In step S45, the occlusion distance map generating section 95 executes occlusion distance map creating processing to generate an occlusion distance map for storage in the occlusion distance map buffer 96.

Figure 18:
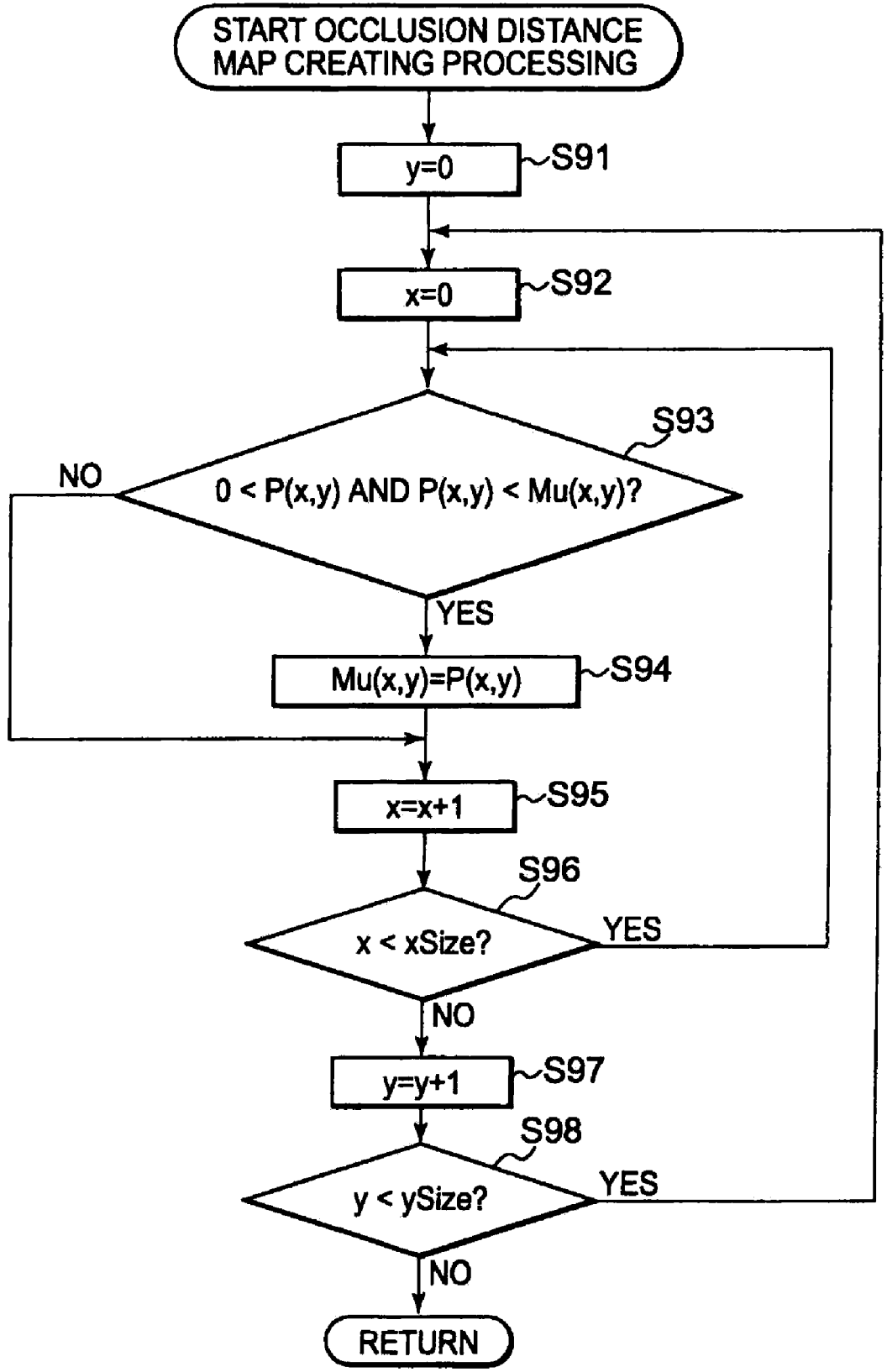
FIG. 18 is a flowchart for illustrating an occlusion distance map creating processing.

Referring here to a flowchart of FIG. 18, the occlusion distance map creating processing will be described.

In step S91, the frame number comparing section 111 initializes a counter y, not shown, which indicates the y-direction value of a pixel on the image whose frame number is (−k) for processing, to 0.

In step S92, the frame number comparing section 111 initializes a counter x, not shown, which indicates the x-direction value of a pixel on the image whose frame number is (−k) for processing, to 0.

In step S93, the frame number comparing section 111 reads a plot map P(x,y) from the plot map buffer 94 and a frame number of an occlusion distance map Mu(x,y) from the occlusion distance map buffer 96, respectively, to determine whether or not the plot map P(x,y) is greater than 0 and smaller than the occlusion distance map Mu(x,y), and supplies the processing result to the frame number changing section 112.

If it is determined in step S93, e.g., that the plot map P(x,y) is greater than 0 and smaller than the occlusion distance map Mu(x,y), the frame number changing section 112 replaces, in step S94, the occlusion distance map Mu (x,y) with the plot map P(x,y).

Meanwhile, if it is determined in step S93, e.g., that the plot map P(x,y) is not greater than 0 or equal to or greater than the occlusion distance map Mu(x,y), step S94 is skipped.

In step S95, the frame number comparing section 111 increments the counter x by 1.

In step S96, the frame number comparing section 111 determines whether or not the counter x is smaller than xSize being the horizontal image size, and if so, the processing returns to step S93. Namely, processing of steps S93 to S96 is repeated for all horizontally extending pixels at y. And if it is determined in step S96 that the counter x is not smaller than xSize, i.e., if it is determined that the processing is completed for a single horizontal row, the processing proceeds to step S97.

In step S97, the frame number comparing section 111 increments the counter y by 1.

In step S98, the frame number comparing section 111 determines whether or not the counter y is smaller than ySize being the vertical image size, and if so, the processing returns to step S92. Namely, processing of steps S92 to S98 is repeated for all horizontally extending pixels at y. And if it is determined in step S98 that the counter y is not smaller than ySize, i.e., if it is determined that the processing is completed for all the pixels in both horizontal and vertical directions, the processing ends.

As a result of the above processing, the occlusion distance map Mu (x,y) is replaced with a plot map value P (x,y) when the plot map value P(x,y) indicates a more recent frame number, whereby processing for sequentially updating the occlusion distance map with a most-recently-exposing frame number is repeated. Thus, the resultant occlusion distance map is accumulated in the occlusion distance map buffer 96.

Returning here to FIG. 15, the description of the flowchart shown therein is continued.

When the occlusion distance map is created in step S45, the terminal point calculating section 101 decrements, in step S46, the counter k by 1. Also, in step S47, the terminal point calculating section 101 determines whether or not the counter k indicates a negative value, i.e., whether or not plot maps are generated for all the images up to the one whose frame number is 0, and further occlusion distance maps are generated. If it is determined in step S47 that the counter k does not indicate a negative value, the processing returns to step S43, and processing of steps S43 to S47 is repeated until the counter k is determined as a negative value.

And when it is determined in step S47 that the counter k indicates a negative value, i.e., that the processing is completed for all the images having frame numbers −N to −1, the output section 97 outputs, in step S48, the occlusion distance map stored in the occlusion distance map buffer 96 to the direct motion vector calculating section 33, whereby the exposure detecting processing ends.

As a result of the above processing, any exposing area in each image is detected as a plot map, and further an occlusion distance map Mu is created on the basis of plot maps P indicating, on a pixel basis, the presence/absence of exposure on a plurality of images for use in removal of noise from an image for processing, as information indicating a most-recently-exposing frame number at each pixel on the image for processing.

Figure 19:
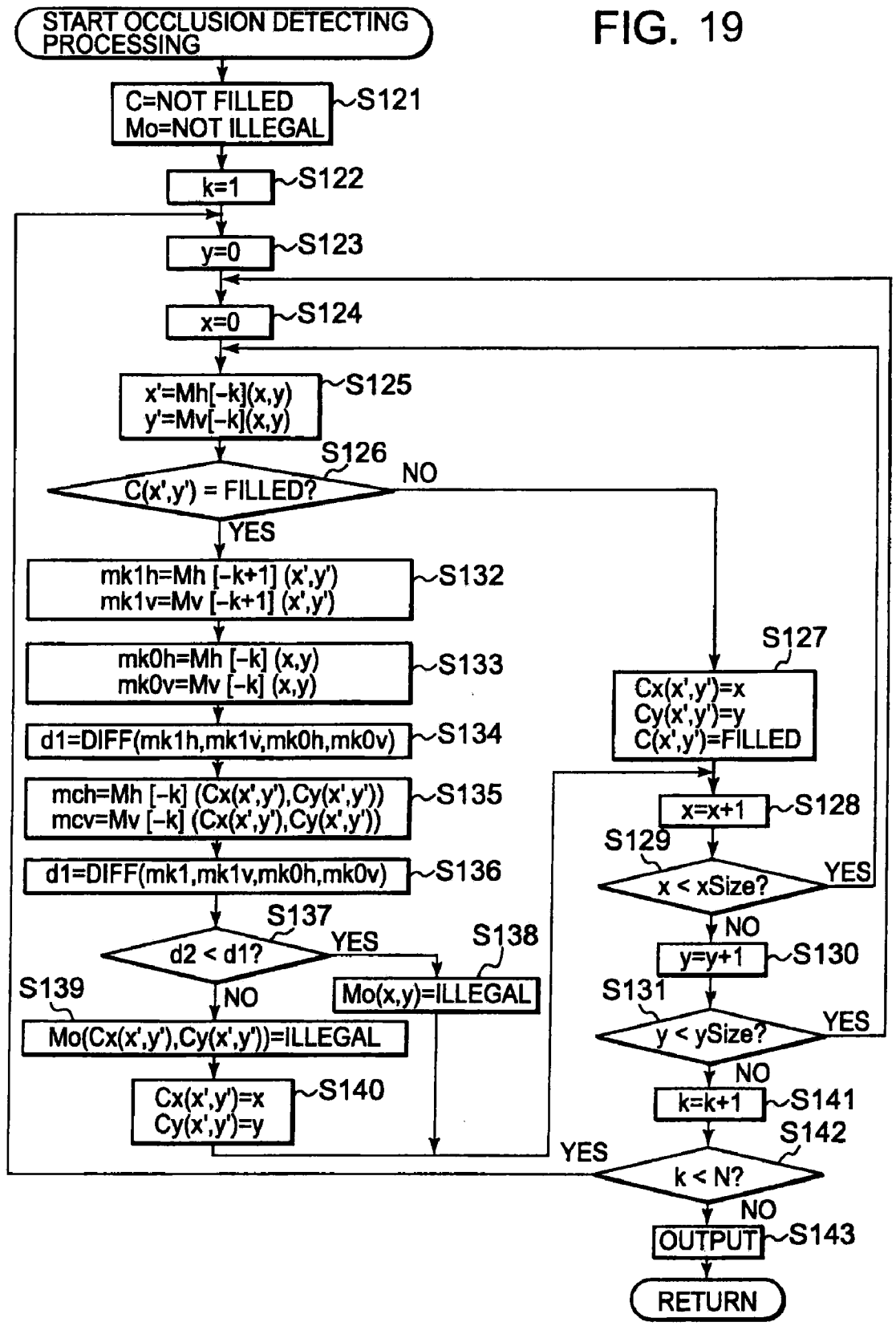
FIG. 19 is a flowchart for illustrating an occlusion detecting processing.

Referring next to the flowchart of FIG. 19, the occlusion detecting processing will be described.

In step S121, the occlusion determining section 52 initializes each element of an intermediate flag map C stored in the intermediate flag map buffer 54 to NOTFILLED (meaning that "there is no element")), and also the occlusion map managing section 62 initializes each element of an occlusion map Mo to NOTILLEGAL (meaning that "an element is not illegal").

In step S122, the terminal point calculating section 51 initializes a frame number counter k, not shown, to 1 being a starting one of frames for superposition.

In step S123, the terminal point calculating section 51 initializes, to 0, a counter y, not shown, which indicates the y-direction value of a pixel on the image whose frame number is (−k) for processing.

In step S124, the terminal point calculating section 51 initializes, to 0, a counter x, not shown, which indicates the x-direction value of a pixel on the image whose frame number is (−k) for processing.

Figure 20:
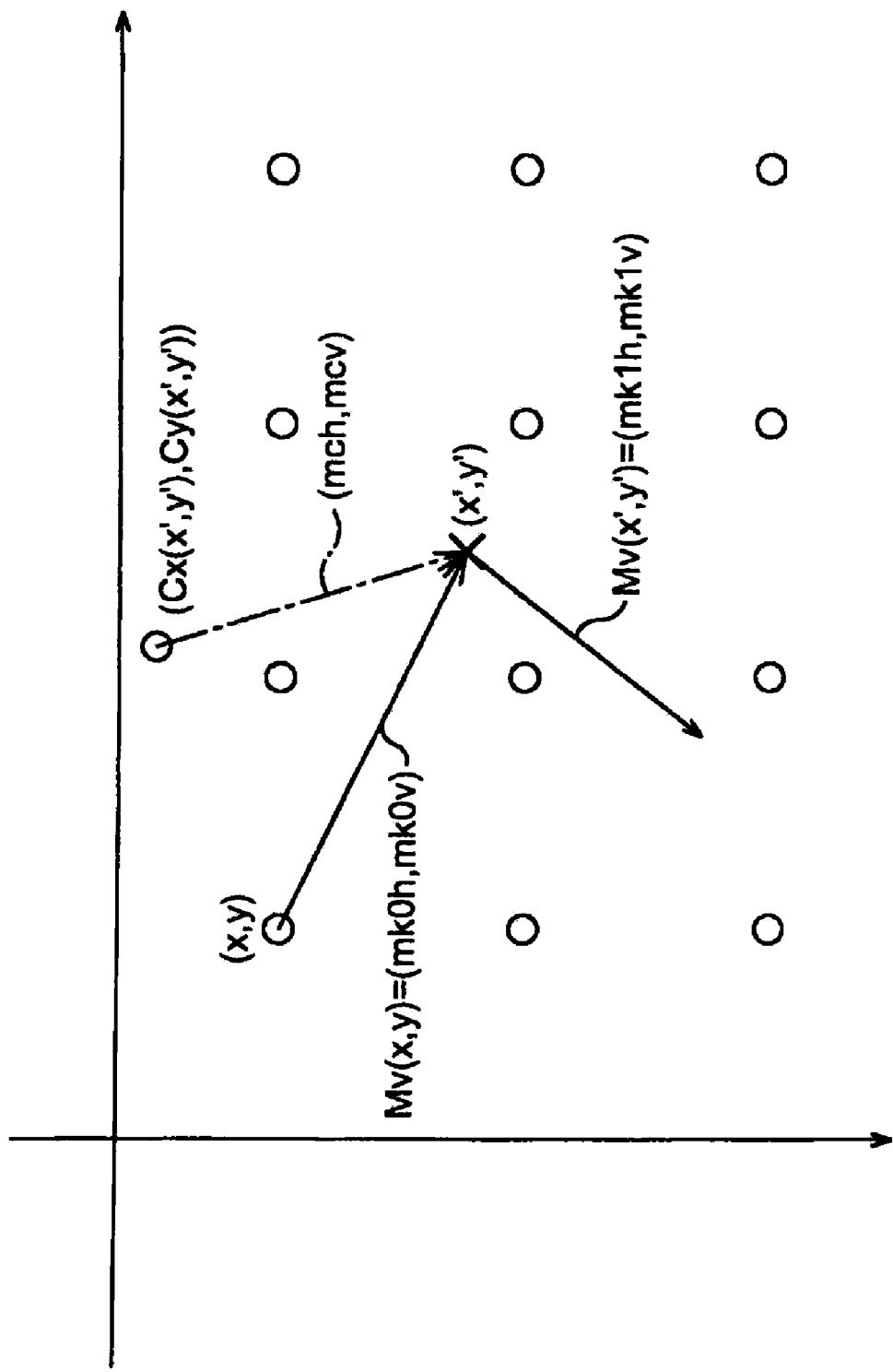
FIG. 20 is a diagram illustrating the occlusion detecting processing.

In step S125, the terminal point calculating section 51 obtains, as shown in FIG. 20, a terminal position (x',y')=(x+Mh[−k] (x,y), Mv[−k] (x,y)) of a motion vector M[−k] (x,y)=(Mh[−k] (x,y), Mv[−k] (x,y)) at a pixel (x,y) on the image whose frame number is (−k) for processing, for supply to the occlusion determining section 52. Note that an open circle in FIG. 20 represents the pixel center.

In step S126, the occlusion determining section 52 accesses the intermediate flag map buffer 54 to determine whether or not an intermediate flag map C(x',y') at the terminal position is FILLED (meaning that "there are elements"), i.e., whether or not it is not NOT FILLED with initialized values, and supplies the determination result and the terminal position information to the intermediate flag map managing section 53, the intermediate position map managing section 55, the intermediate vector reading section 57, and the immediately preceding frame vector reading section 59.

If it is determined in step S126, e.g., that the intermediate flag map C(x',y') remains NOT FILLED with the initialized values, and thus is not FILLED, the intermediate flag map managing section 53 updates, in step S127, the intermediate flag map C (x', y')=NOT FILLED to an intermediate flag map C(x',y')=FILLED, and also the intermediate position map managing section 55 replaces an intermediate position map (Cx(x',y'), Cy(x',y')) stored in an intermediate position map buffet with (x,y). Namely, the intermediate flag map C(x',y') is registered as FILLED for each pixel position as the terminal point of its motion vector, and at the same timing, in the intermediate position map (Cx(x',y'), Cy(x',y')), the pixel position being a starting point of the motion vector pointing that terminal point is registered.

If it is determined in step S126, e.g., that the intermediate flag map C(x',y') is FILLED, the immediately preceding frame vector reading section 59 reads, in step S132, a motion vector mk1=(mk1h, mk1v)=(Mh[−k+1] (x',y'), Mv[−k+1] (x', y')) of the terminal position (x',y') stored in the motion vector buffer 13, for supply to the difference calculating section 60.

In step S133, the difference calculating sections 58, 60 each reads a motion vector M[−k] (x,y)=(mk0h, mk0v)=(Mh[−k] (x,y), Mv[−k] (x,y)) at the pixel (x,y) for processing from the motion vector buffer 13.

In step S134, the difference calculating section 60 obtains a difference d1 (=DIFF(mk1h, mk1v, mk0h, mk0v), for output to the comparing section 61. Here, DIFF(mk1h, mk1v, mk0h, mk0v) is a difference between the lengths of the vector (mk1h, mk1v) and a vector (mk0h, mk0v), and the difference d1=|√(mk1h2+mk1v2)−√(mk0h2+mk0v2)|.

In step S135, the difference calculating section 58 reads, from the intermediate position map buffer 56, a motion vector M[−k] (Cx(x',y'), Cy(x',y')) at the pixel C(x',y') set in the processing so far performed with (x',y') as the terminal position, for conversion into (mch, mcv) M[−k] (Cx(x',y'), Cy(x', y'))=(Mh[−k](Cx(x',y'), Cy(x',y')), Mv[−k](Cx(x',y'), Cy(x', y'))).

In step S136, the difference calculating section 58 obtains a difference d2 (=DIFF(mk1h, mk1v, mch, mcv), for output to the comparing section 61. Here, DIFF(mk1h, mk1v, mch, mcv) is a difference between the lengths of the vector (mk1h, mk1v) and a vector (mch, mcv), and the difference d2=|√(mk1h2+mk1v2)−√(mch2+mcv2)|.

In step S137, the comparing section 61 determines whether or not the difference d2 is smaller than the difference d1, and outputs the comparison result to the occlusion map managing section 62 and the intermediate position map managing section 55.

If it is determined in step S137 that the difference d2 is smaller than the difference d1, i.e., as shown in FIG. 20, that the difference d2 being a distance between the terminal position (x',y') of the motion vector and the pixel position (x,y) on the image whose frame number is (−k) is smaller than the difference d1 being the distance between the terminal position (x',y') of the mot-on vector and (Cx(x',y'), Cy(x',y')) on the frame number (−k+1). Thus, (x,y) on the image whose frame number is (−k) is closer to the terminal position (x',y') than (Cx(x',y'), Cy(x',y')) on the frame number (−k+1). Consequently, in step S138, the occlusion map managing section 62 sets an occlusion map Mo(x,y) stored in the occlusion map buffer 63 as ILLEGAL, i.e., registers that pixel as being illegal as an occluding position.

Meanwhile, if it is determined in step S137 that the difference d2 is not smaller than the difference d1, i.e., as shown in FIG. 20, that the difference d2 being the distance between the terminal position (x',y') of the motion vector and the pixel position (x,y) on the image whose frame number is (−k) is not smaller than the difference d1 being the distance between the terminal position (x',y') of the motion vector and Cx(x',y'), Cy(x',y')) on the frame number (−k+1). Thus, (x,y) on the image whose frame number is (−k) is remoter from the terminal position (x',y') than (Cx(x',y'), Cy(x',y')) on the frame number (−k+1). Consequently, in step S139, the occlusion map managing section 62 sets an occlusion map Mo(Cx(x', y'), Cy(x',y')) stored in the occlusion map buffer 63 to ILLEGAL, i.e., registers that pixel as being illegal as an occluding position.

Then, in step S140, the intermediate position map managing section 55 replaces the intermediate position map (Cx (x',y'), Cy(x',y')) stored in the intermediate position map buffer 56, with (x,y).

In step S128, the terminal point calculating section 51 increments the counter x by 1.

In step S129, the terminal point calculating section 51 determines whether or not the counter x is smaller than xSize being the horizontal image size, and if so, the processing returns to step S125. Namely, processing of steps S125 to S129 is repeated until an occlusion map is obtained for all horizontally extending pixels at y. And if it is determined in step S129 that the counter x is not smaller than xSize, i.e., if it is determined that the processing is completed for a single horizontal row, the processing proceeds to step S130.

In step S130, the terminal point calculating section 51 increments the counter y by 1.

In step S131, the terminal point calculating section 51 determines whether or not the counter y is smaller than ySize being the vertical image size, and if so, the processing returns to step S124. Namely, processing of steps S124 to S140 is repeated until the occlusion map is obtained for all horizontally extending pixels at y. And if it is determined in step S131 that the counter y is not smaller than ySize, i.e., if it is determined that the processing is completed for all the pixels in both horizontal and vertical directions, the terminal point calculating section 51 increments, in step S141, the counter k by 1.

In step S142, the terminal point calculating section 51 determines whether or not the counter k is less than N being the number of images for superposition on the image for processing, and if so, the processing returns to step S123. Namely, steps S123 to S142 are repeated until occlusion maps are obtained for all the images for superposition. And if it is determined in step S142 that the counter k is equal to N or less, i.e., if it is determined that occlusion maps are obtained for all the images for superposition, the output section 64 reads, in step S143, the occlusion maps stored in the occlusion map buffer 63 for output to the direct motion vector calculating section 33, whereby the processing ends.

As a result of the above processing, among pixels, each being on a different image, whose motion vectors point to the same terminal position, any pixel whose position is not remotest from the terminal position is detected as an occluding area, and registered as an occlusion map Mo(x,y).

Figure 14:
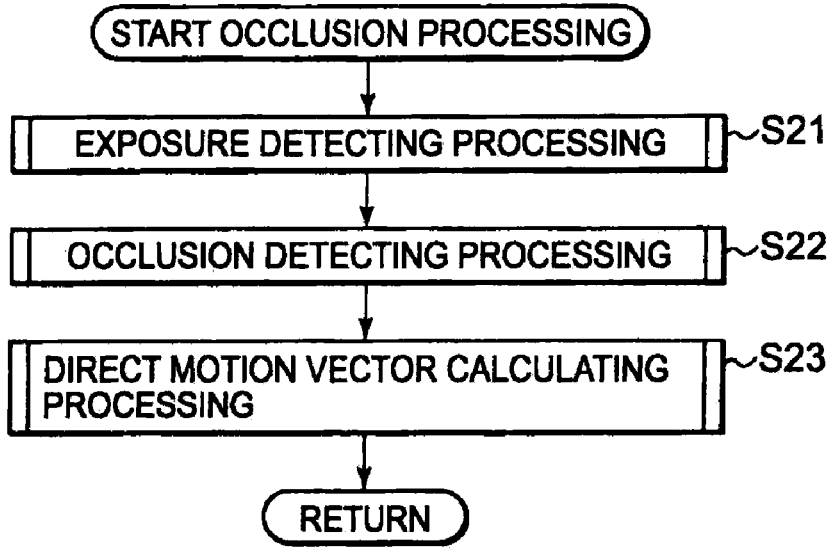
FIG. 14 is a flowchart for illustrating an occlusion processing.

Referring next to FIG. 14, the direct motion vector calculating processing will be outlined.

The direct motion vector calculating processing is processing for calculating a direct motion vector from a pixel on any old frame to a pixel on an image for processing whose frame number is (0). By the way, a direct motion vector from a pixel on an image whose frame number is (−k) to the pixel on the image whose frame number is (0) is the sum of a direct motion vector from a pixel on a frame number (−k+1) to the pixel on the frame number (0) and a motion vector from the pixel on an image whose frame number is (−k) to the pixel on an image whose frame number is (−k+1). Therefore, if the direct motion vector from the pixel on the frame number (−k+1) to the pixel on an image whose frame number is (0) and the motion vector from the pixel on an image whose frame number is (−k) to the pixel on an image whose frame number (−k+1) are obtained, the direct motion vector from the pixel on any old frame to the pixel on the image whose frame number is (0) should be obtained.

Figure 21:
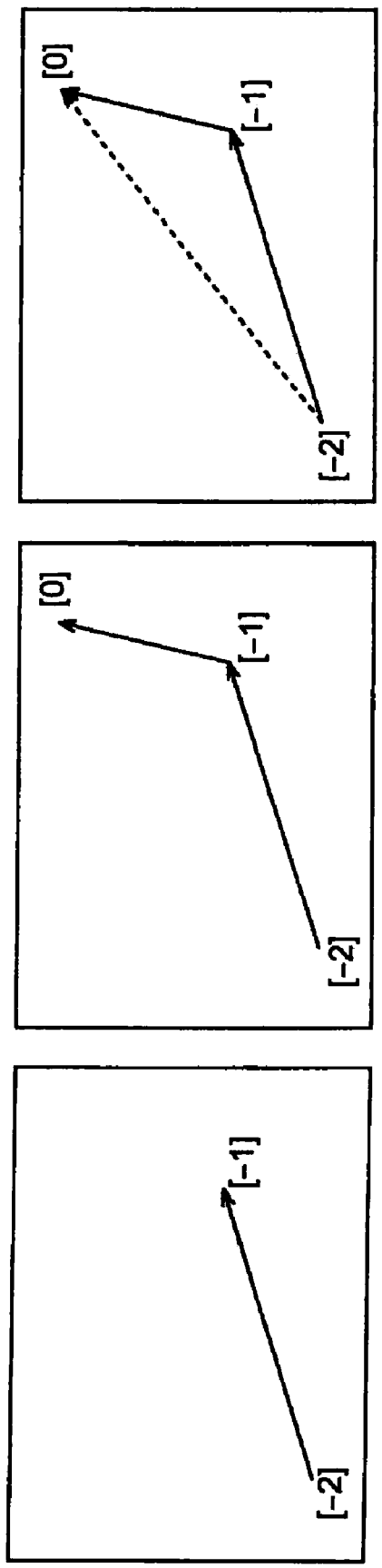
FIG. 21 is a diagram illustrating a direct motion vector calculating processing.

Namely, a motion vector from a pixel on a frame number (−1) to a pixel on the frame number (0) is obtained. Also, a motion vector from a pixel on a frame number (−2) to the pixel on the frame number (−1) is obtained. Thus, as indicated by a solid arrow on the left of FIG. 21, a succeeding motion vector pointed by the motion vector at each pixel on the frame number (−2) is obtained, and then as indicated by a solid arrow in the middle of FIG. 21, the motion vector thus obtained is synthesized with the motion vector on the frame number (−2), whereby a motion vector to the frame number (0) can be obtained from the motion vector on the frame number (−2), as indicated by a dotted arrow in the right of FIG. 21. Hence, as to each pixel on each of images whose frame numbers extend from (−N) to (−1), its direct motion vector to the pixel on the frame number (0) can be obtained recursively.

Figure 22:
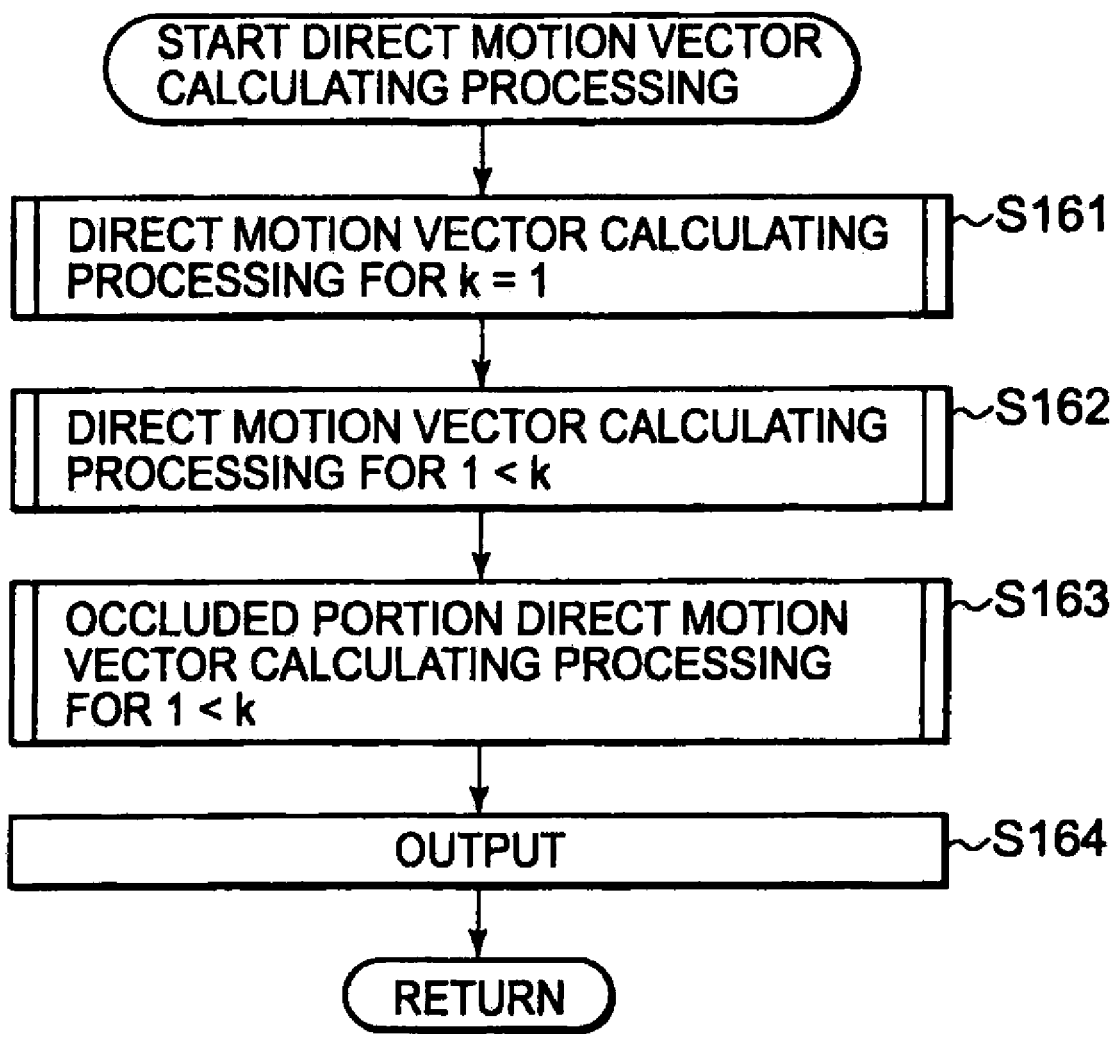
FIG. 22 is a flowchart for illustrating the direct motion vector calculating processing.

Referring next to a flowchart of FIG. 22, the direct motion vector calculating processing will be described.

In step S161, the direct motion vector calculating processing is executed on pixels on an image whose frame number is (−1) (k=1) to calculate direct motion vectors at the pixels on the image whose frame number is (−1). Namely, through this processing, motion vectors each indicating a pixel position for superposition on the image whose frame number is (0) are obtained for the corresponding pixels on the frame number (−1) being the immediately preceding frame from the image whose frame number is (0) for processing. Note that the direct motion vector calculating processing at pixels on the image whose frame number is (−1) will be described in detail later with reference to a flowchart of FIG. 23.

In step S162, the direct motion vector calculating processing at pixels on an image whose frame number is (−k) (k>1) is executed to calculate direct motion vectors in which an exposing area of pixels on the image whose frame number is (−k) (k>1) is considered. Note that the direct motion vector calculating processing at pixels on the image whose frame number is (−k) (k>1) will be described in detail later with reference to a flowchart of FIG. 24.

In step S163, occluding portion direct motion vector calculating processing is executed in which both an exposing area and an occluding area of pixels on an image whose frame number is (−k) (k>1) are considered, to calculate occluding portion direct motion vectors at pixels on the image whose frame number is (−k) (k>1). Note that the occluding portion direct motion vector calculating processing at pixels on the image whose frame number is (−k) (k>1) will be described in detail with reference to a flowchart of FIG. 25.

In step S164, the output section 146 reads the direct motion vectors stored in the direct motion vector buffer 145, the occluding portion direct motion vectors stored in the occluding portion direct motion vector buffer 149, and the occlusion maps stored in the occlusion map buffer 147, for supply to the image synthesizing unit 15.

As a result of the above processing, the direct motion vectors considering an exposing area and the occluding portion direct motion vectors are obtained, for supply to the image synthesizing unit 15 together with the occlusion maps.

Figure 23:
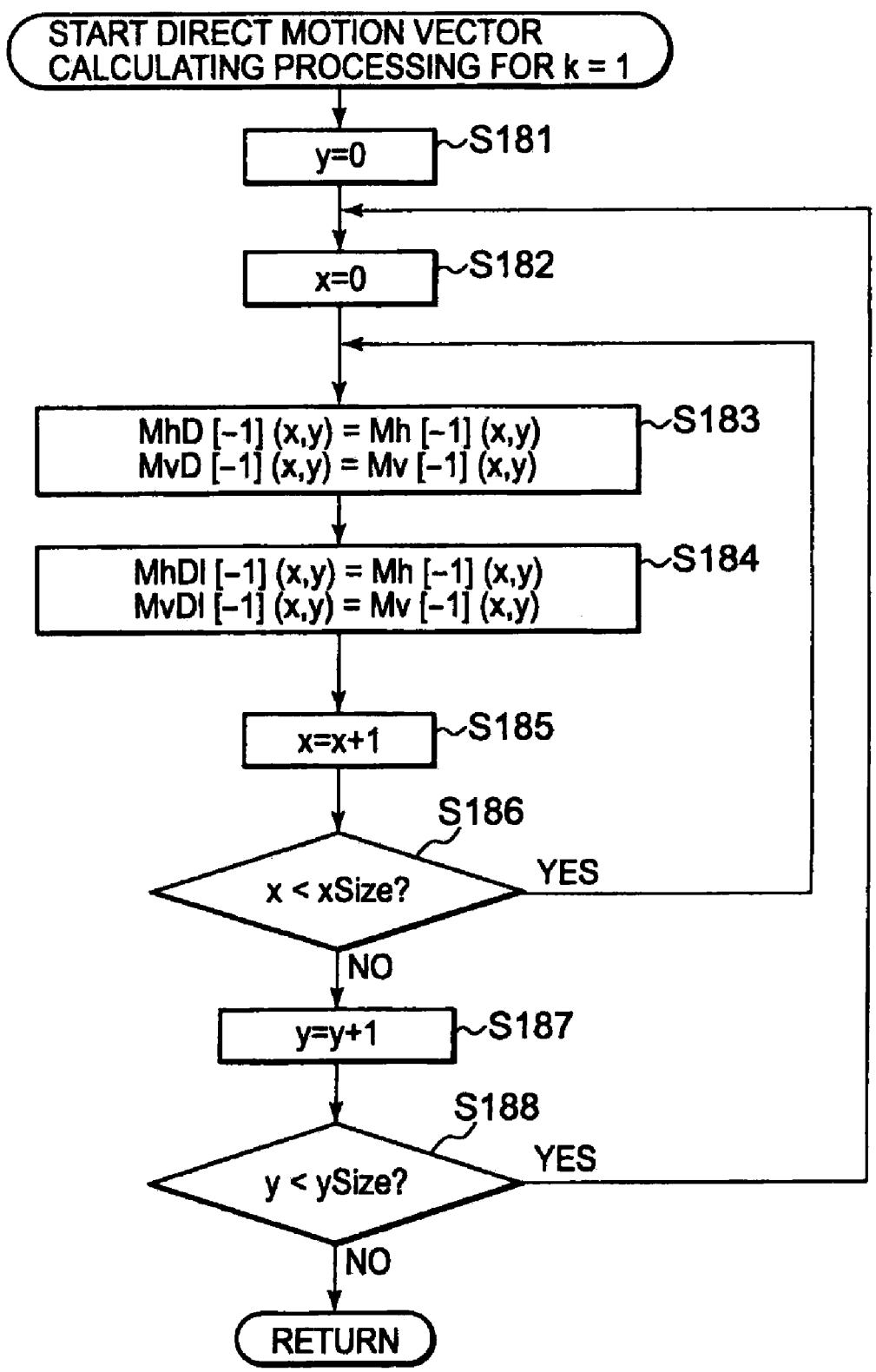
FIG. 23 is a flowchart for illustrating a direct motion vector calculating processing for k=1.

Referring next to the flowchart of FIG. 23, the direct motion vector calculating processing at pixels on the image whose frame number is (−1) will be described.

In step S181, the terminal point calculating section 141 initializes a counter y, not shown, to 0 which indicates the y-direction value of a pixel on the image whose frame number is (−1) for processing.

In step S182, the terminal point calculating section 141 initializes to 0, a not-shown counter x, which indicates the x-direction value of a pixel on the image whose frame number is (−1) for processing.

In step S183, the direct motion vector generating section 144 reads a motion vector M[−1] (x,y)=(Mh[−1] (x,y), Mv[−1] (x,y)) on the frame number (−1) from the motion vector buffer 13 to set this as a direct motion vector MD[−1] (x,y)=M[−1] (x,y)=(MhD[−1] (x,y), MvD[−1] (x,y))= (Mh[−1] (x,y), Mv[−1] (x,y)) on the frame number (−1), for registration in the direct motion vector buffer 145.

In step S184, the occluding portion direct motion vector generating section 148 reads the motion vector M[−1] (x,y)= (Mh[−1] (x,y), Mv[−1] (x,y)) on the frame number (−1) from the motion vector buffer 13 to set this to an occluding portion direct motion vector MDI[−1] (x,y)=M[−1] (x,y)= (MhDI[−1] (x,y), MvDI[−1] (x,y))=(Mh[−1] (x,y), Mv[−1] (x,y)) on the frame number (−1), for registration in the occluding portion direct motion vector buffer 149.

In step S185, the terminal point calculating section increments the counter x by 1.

In step S186, the terminal point calculating section 141 determines whether or not the counter x is smaller than xSize being the horizontal image size, and if so, the processing returns to step S183. Namely, processing of steps S183 to S186 is repeated until direct motion vectors are obtained for all horizontally extending pixels at y. And if it is determined in step S186 that the counter x is not smaller than xSize, i.e., if it is determined that the processing is completed for a single horizontal row, the processing proceeds to step S187.

In step S187, the terminal point calculating section 141 increments the counter y by 1.

In step S188, the terminal point calculating section 141 determines whether or not the counter y is smaller than ySize being the vertical image size, and if so, the processing returns to step S183. Namely, steps S183 to S188 are repeated until direct motion vectors are obtained for all horizontally extending pixels at y. And if it is determined in step S188 that the counter y is not smaller than ySize, i.e., if it is determined that the processing is completed for all the pixels in both horizontal and vertical directions, the processing ends.

As a result of the above processing, motion vectors themselves at pixels on the image immediately preceding the image whose frame number is (0) for processing are set as direct motion vectors and occluding portion direct motion vectors.

Figure 24:
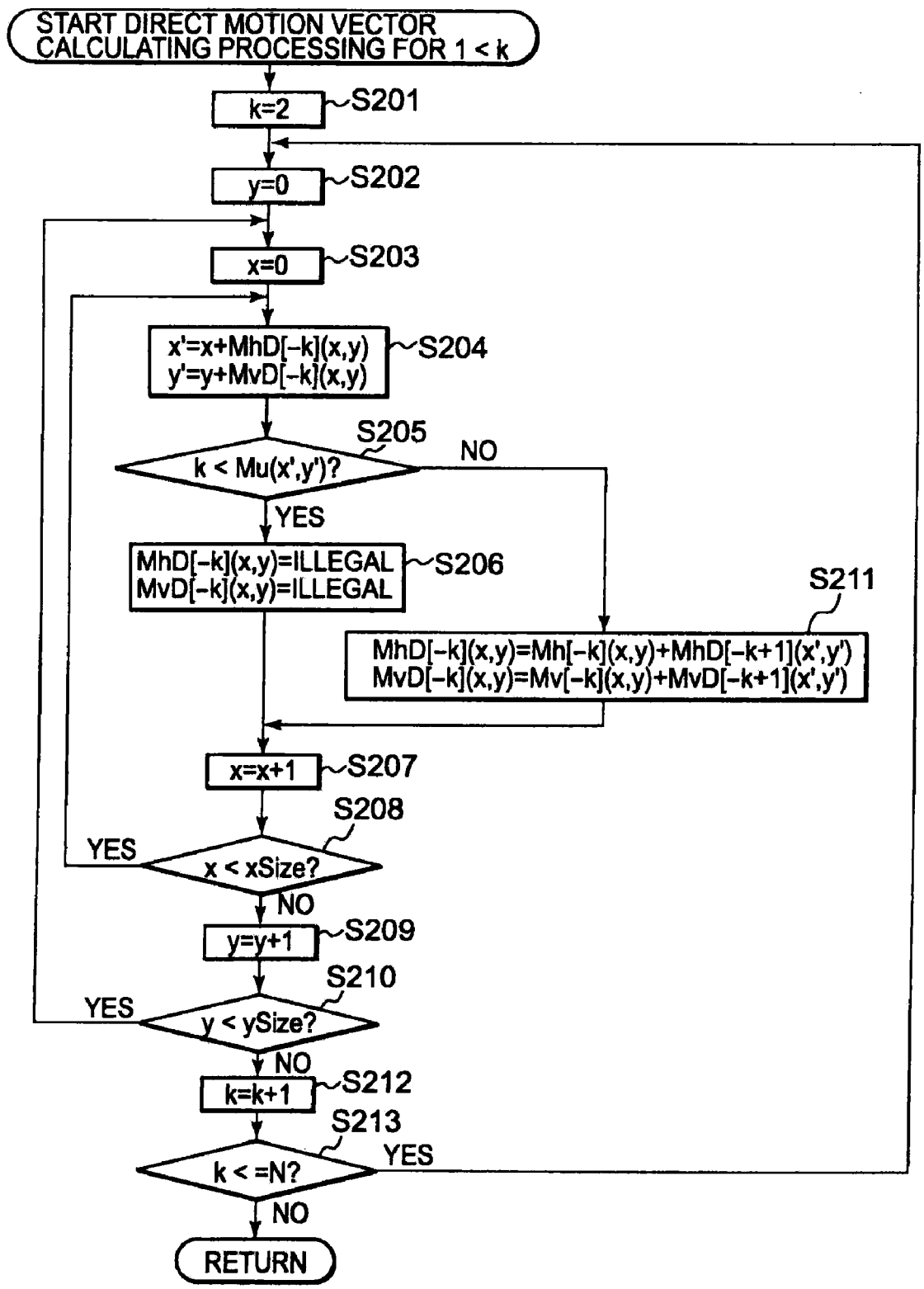
FIG. 24 is a flowchart for illustrating a direct motion vector calculating processing for k>1.

Referring next to the flowchart of FIG. 24, the direct motion vector calculating processing at pixels on the image whose frame number is (−k) (k>1) will be described.

In step S201, the terminal point calculating section 141 initializes a frame number counter k, not shown, to 2. Since the processing for the counter k=1 is completed by the processing described with reference to FIG. 23, the counter k is initialized to 2 here.

In step S202, the terminal point calculating section 141 initializes, to 0, the counter y, not shown, which indicates the y-direction value of a pixel on the image whose frame number is (−k) for processing.

In step S203, the terminal point calculating section 141 initializes, to 0, the counter x, not shown, which indicates the x-direction value of a pixel on the image whose frame number is (−k) for processing.

In step S204, the terminal point calculating section 141 obtains a terminal position (x',y')=(x+Mh[−k] (x,y), y+Mv[−k] (x,y)) of a motion vector M[−k] (x,y)=(Mh[−k] (x,y), Mv[−k] (x,y)) at a pixel (x,y) on the image whose frame number is (−k) for processing, for supply to the occlusion distance determining section 142.

In step S205, the occlusion distance determining section 142 accesses the occlusion distance map buffer 143 in which occlusion distance maps supplied from the exposure detecting section 32 are stored, to determine whether or not an occlusion distance map Mu(x',y') is greater than the counter k, i.e., whether or not it is greater than a most-recently-exposing frame number, and supplies the determination result to the occluding portion direct motion vector generating section 148.

If it is determined in step S205, e.g., that the occlusion distance map Mu(x',y') is greater than the counter k, i.e., that it is greater than the most-recently-exposing frame number, a pixel is deemed as not exposed yet, and the direct motion vector generating section 144 registers, in step S206, that pixel as being illegal in the direct motion vector buffer 145, by setting that pixel as a direct motion vector MD[−k](x,y)=(MhD[−k](x,y), MvD[−k](x,y))=(ILLEGAL, ILLEGAL).

Meanwhile, if it is determined in step S205, e.g., that the occlusion distance map Mu(x',y') is not greater than the counter k, i.e., that it is not greater than the most-recently-exposing frame number, the pixel is deemed as already exposing, and the direct motion vector generating section 144 registers, in step S211, that pixel as a direct motion vector MD[−k](x,y)=(Mh[−k](x,y)+MhD[−k+1](x',y'), Mv[−k](x,y)+MvD[−k+1] (x',y')), in the direct motion vector buffer 145. Namely, the sum of a direct motion vector whose terminal position is (x,y) and which is to be obtained for the immediately preceding frame number (−k+1) and a motion vector on the current frame number (−k) is obtained to generate a new direct motion vector.

In step S207, the terminal point calculating section 141 increments the counter x by 1.

In step S208, the terminal point calculating section 141 determines whether or not the counter x is smaller than xSize being the horizontal image size, and if so, the processing returns to step S204. Namely, processing of steps S204 to S208 and S211 is repeated until direct motion vectors are obtained for all horizontally extending pixels at y. And if it is determined in step S208 that the counter x is not smaller than xSize, i.e., if it is determined that the processing is completed for a single horizontal row, the processing proceeds to step S209.

In step S209, the terminal point calculating section 141 increments the counter y by 1.

In step S210, the terminal point calculating section 141 determines whether or not the counter y is smaller than ySize being the vertical image size, and if so, the processing returns to step S203. Namely, processing of steps S203 to S211 is repeated until direct motion vectors are obtained for all horizontally extending pixels at y. And if it is determined in step S210 that the counter y is not smaller than ySize, i.e., if it is determined that the processing is completed for all the pixels in both horizontal and vertical directions, the processing proceeds to step S212.

In step S212, the terminal point calculating section 141 increments the counter k by 1.

In step S213, the terminal point calculating section 141 determines whether or not the counter k is equal to N or less being the number of images for superposition, and if so, the processing returns to step S202. Namely, steps S202 to S213 are repeated until the processing is performed on all the images for superposition to remove noises.

And when it is determined in step S213 that the counter k is not equal to N or less, i.e., when it is determined that all direct motion vectors are obtained for each pixel on all the images for superposition, the processing ends.

As a result of the above processing, direct motion vectors from each pixel on images which are two or more images preceding the image whose frame number is (0) for processing are set. In this case, any pixel which is on an old frame and which is an area located at a distance greater than the value indicated by the corresponding occlusion distance map Mu is registered as being illegal and unusable, and thus, direct motion vectors considering an exposing frame number can be set for an exposing area.

Note that the occlusion distance map tells any exposing frame number on a pixel basis. Hence, future frames may be used to interpolate as many frames as one failed to interpolate, whereby the noise reduction effect can be maintained even for an exposing area.

Figure 25:
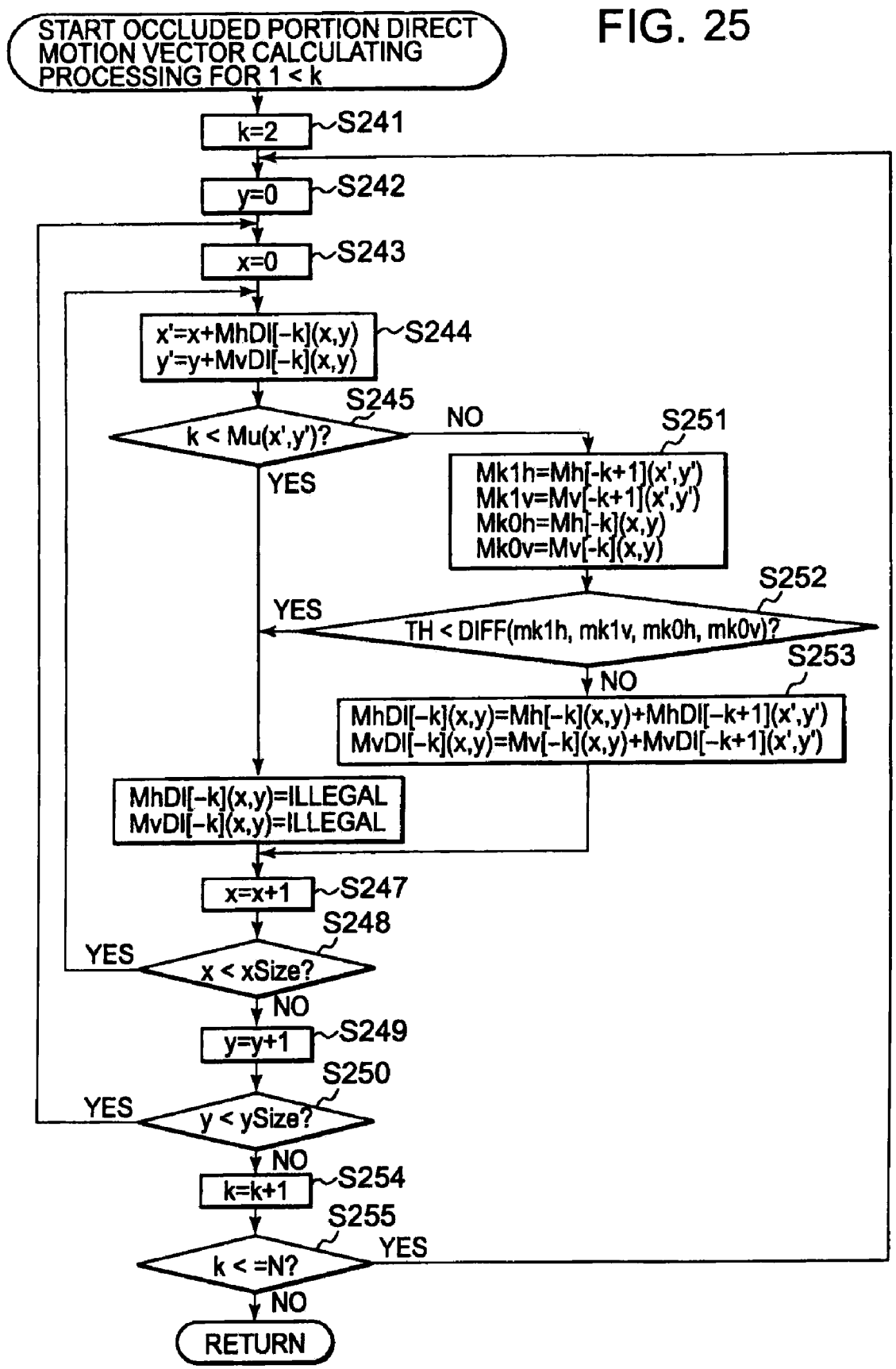
FIG. 25 is a flowchart for illustrating an occluding portion direct motion vector calculating processing for k>1.

Referring next to the flowchart of FIG. 25, the occluding portion direct motion vector calculating processing at pixels on the image whose frame number is (−k) (k>1) will be described.

In step S241, the terminal point calculating section 141 initializes the frame number counter k, not shown, to 2. Since the processing for the counter k=1 is completed by the processing described with reference to FIG. 23, the counter k is initialized to 2 here.

In step S242, the terminal point calculating section 141 initializes, to 0, the counter y, not shown, which indicates the y-direction value of a pixel on the image whose frame number is (−k) for processing.

In step S243, the terminal point calculating section 141 initializes, to 0, the counter x, not shown, which indicates the x-direction value of a pixel on the image whose frame number is (−k) for processing.

In step S244, the terminal point calculating section 141 obtains a terminal position (x',y')=(x+Mh[−k] (x,y), y+Mv[−k] (x,y)) of a motion vector M[−k] (x,y)=(Mh[−k] (x,y), Mv[−k] (x,y)) at a pixel (x,y) on the image whose frame number is (−k) for processing, for supply to the occlusion distance determining section 142.

In step S245, the occlusion distance determining section 142 accesses the occlusion distance map buffer 143 storing therein occlusion distance maps supplied from the exposure detecting section 32, to determine whether or not an occlusion distance map Mu(x',y') is greater than the counter k, i.e., whether or not it is greater than a most-recently-exposing frame number, and supplies the determination result to the occluding portion direct motion vector generating section 148.

If it is determined in step S245, e.g., that the occlusion distance map Mu(x',y') is greater than the counter k, i.e., that it is greater than the most-recently-exposing frame number, the pixel is deemed as not exposing yet, and the occluding portion direct motion vector generating section 148 registers, in step S246, that pixel as being illegal in the occluding portion direct motion vector buffer 149, by setting that pixel as a direct motion vector MDI[−k] (x,y)=(MhDI[−k] (x,y), MvDI[−k] (x,y))=(ILLEGAL, ILLEGAL).

Meanwhile, if it is determined in step S245, e.g., that the occlusion distance map Mu(x',y') is not greater than the counter k, i.e., that it is not greater than the most-recently-exposing frame number, the pixel is deemed as already exposing, and in step S251, a comparing section 148a converts a motion vector mk1=(mk1$h$, mk1$v$) whose terminal position is (x',y') on the frame number (−k+1) being the immediately preceding frame, into (mk1=(mk1$h$, mk1$v$)=(Mh[−k+1] (x', y'), Mv[−k+1] (x',y')), and also converts a motion vector mk0=(mk0$h$, mk0$v$) at (x,y) into (mk0$h$, mk0$v$)=(Mh[−k] (x,y), Mv[−k] (x,y)).

In step S252, the comparing section 148a determines whether or not a difference between the lengths of the motion vectors mk0, mk1 is greater than a predetermined threshold value TH. More specifically, the comparing section 148a obtains a difference (=DIFF(mk1$h$, mk1$v$, mk0$h$, mk0$v$), and compares it with the threshold value TH. Here, DIFF(mk1$h$, mk1$v$, mk0$h$, mk0$v$) is a difference=|√(mk1$h$2+mk1$v$2)−√(mk0$h$2+mk0$v$2)|.

If it is determined in step S252, e.g., that the difference between the lengths of the motion vectors mk0, mk1 is not greater than the predetermined threshold value TH, the pixel is deemed as not occluding, and the occluding portion direct motion vector generating section 143 registers, in step S253, that pixel as an occluding portion direct motion vector MDI [−k](x,y)=(Mh[−k](x,y)+MhDI[−k+l](x',y'), Mv[−k](x,y)+MvDI[−k+1](x',y')), in the occluding portion direct motion vector buffer 149. Namely, the sum of an occluding portion direct motion vector whose starting position is (x,y) and terminal position is (x',y') for the frame number (−k) and motion vector whose starting position is (x', y'), for the immediately subsequent frame number (−k+1) is obtained to generate a new occluding portion direct motion vector from starting position (x,y) of (−k)frame.

Meanwhile, if it is determined in step S252, e.g., that the difference between the lengths of the motion vectors mk0, mk1 is greater than the predetermined threshold value TH, the pixel is deemed as an occluded background, whereby the processing proceeds to step S246 to register that pixel as being illegal.

In step S247, the terminal point calculating section 141 increments the counter x by 1.

In step S248, the terminal point calculating section 141 determines whether or not the counter x is smaller than xSize being the horizontal image size, and if so, the processing returns to step S244. Namely, steps S244 to S248 and S251 to S253 are repeated until occluding portion direct motion vectors are obtained for all horizontally extending pixels at y. And if it is determined in step S248 that the counter x is not smaller than xSize, i.e., if it is determined that the processing is completed for a single horizontal row, the processing proceeds to step S249.

In step S249, the terminal point calculating section 141 increments the counter y by 1.

In step S250, the terminal point calculating section 141 determines whether or not the counter y is smaller than ySize being the vertical image size, and if so, the processing returns to step S243. Namely, processing of steps S243 to S253 is repeated until direct motion vectors are obtained for all horizontally extending pixels at y. And if it is determined in step S250 that the counter y is not smaller than ySize, i.e., if it is determined that the processing is completed for all the pixels in both horizontal and vertical directions, the processing proceeds to step S254.

In step S254, the terminal point calculating section 141 increments the counter k by 1.

In step S255, the terminal point calculating section 141 determines whether or not the counter k is equal to N or less being the number of images for superposition, and if so, the processing returns to step S242. Namely, processing of steps S242 to S255 is repeated until the processing is performed on all the images to be superposed for removing noise.

And when it is determined in step S255 that the counter k is neither equal to nor less than N, i.e., that all direct motion vectors are obtained for each pixel on all the images for superposition, the processing ends.

As a result of the above processing, occluding portion direct motion vectors at each pixel on images which are two or more images preceding the image whose frame number is (0) for processing are set. In doing so, any pixel which is on an old frame and which is an area located at a distance greater than the value indicated by the corresponding occlusion distance map is registered as being illegal and unusable, and thus, occluding portion direct motion vectors considering an exposing frame number can be set for an exposing area.

Additionally, as to an occluding area, a motion vector from the frame number (−k) to the frame number (−k+1) is compared with a motion vector from the frame number (−k+1) to the frame number (−k+2). If the difference between them is greater than a predetermined value, the pixel is considered to be an occluded background, and thus the motion vector thereof is excluded.

Returning here to FIG. 13, the description of the flowchart shown therein is continued.

Through the processing of step S5, when the direct motion vectors, occluding portion direct motion vectors, and occlusion maps in which an exposing area is considered are supplied to the image synthesizing unit 15 by the occlusion processing, the image synthesizing unit 15 executes, in step S6, image synthesizing processing to generate an image from which noise is removed by superposing a plurality of images, on the basis of the direct motion vectors, occluding portion direct motion vectors, and occlusion maps.

Figure 26:
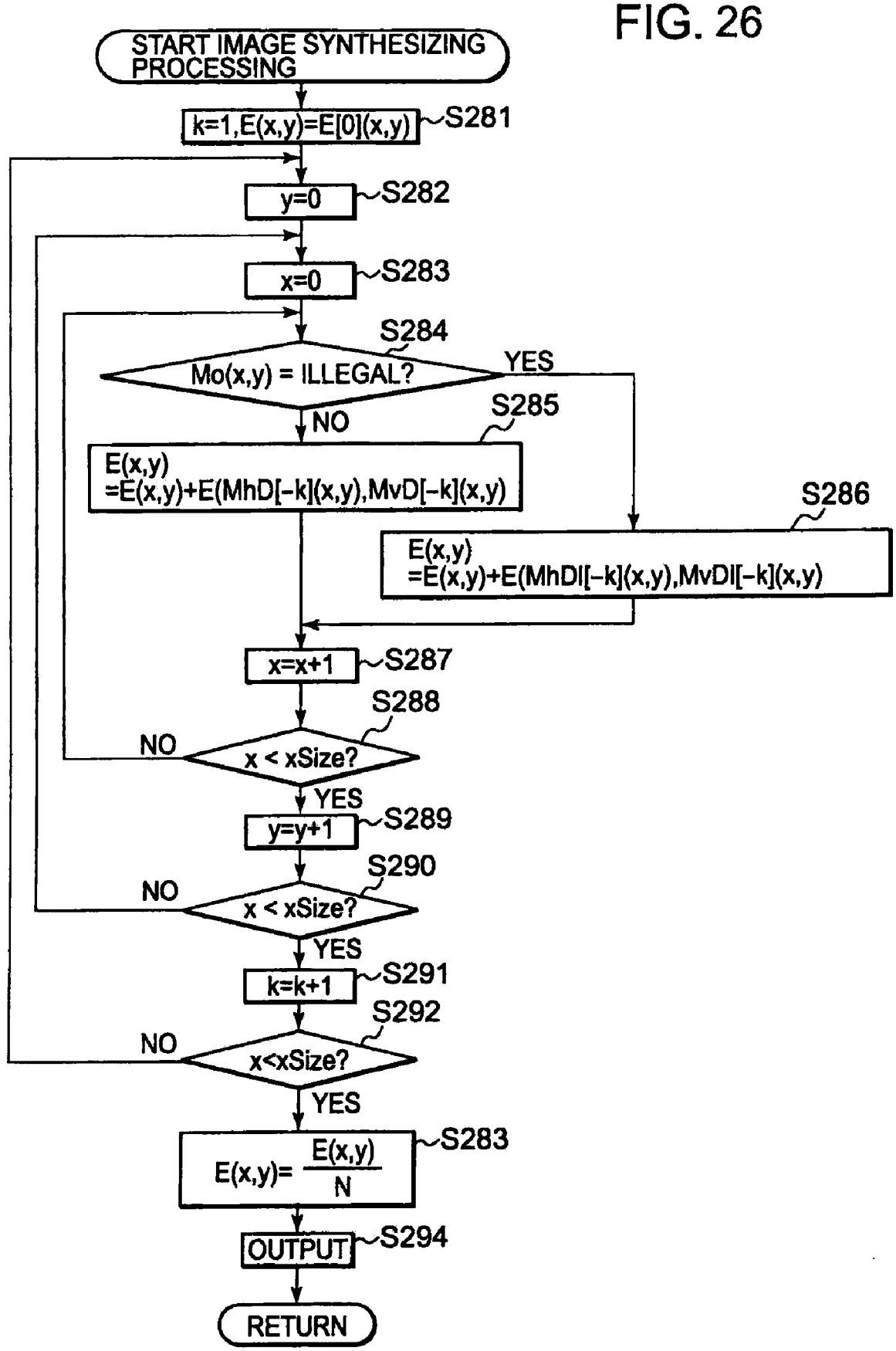
FIG. 26 is a flowchart for illustrating an image synthesizing processing.

Referring here to a flowchart of FIG. 26, the image synthesizing processing will be described.

In step S281, the occlusion determining section 15a initializes a frame number counter k, not shown, to 1, and also initializes a pixel value E(x,y) of each pixel to a pixel value E[0] (x,y) on an image for processing, i.e., the frame number (0), and then stores them in the buffer 15c.

In step S282, the occlusion determining section 15a initializes, to 0, a counter y, not shown, which indicates the y-direction value of a pixel on the image whose frame number is (−k) for processing.

In step S283, the occlusion determining section 15a initializes, to 0, a counter x, not shown, which indicates the x-direction value of a pixel on the image whose frame number is (−k) for processing.

In step S284, the occlusion determining section 15a determines whether or not the occlusion map of a pixel (x,y) on the image for processing is registered as ILLEGAL, i.e., whether or not the pixel is an occluding area.

If it is determined in step S284, e.g., that the occlusion map Mo(x,y) is not ILLEGAL, i.e., that the pixel is not in all occluding area, the synthesizing section 15b obtains (E(x,y)= E(x,y)+E(MhD[-k](x,y), MvD[-k](x,y))) by superposing, in step S285, a pixel value E(MhD[-k](x,y), MvD[-k] (x,y)) of a pixel whose motion vector terminal position is a pixel for processing on the frame number (-k) designated by a direct motion vector, on the pixel value E(x,y), to update and store the value in the buffer 15c.

Meanwhile, if it is determined in step S284, e.g., that the occlusion map Mo(x,y) is ILLEGAL, i.e., that the pixel is an occluding area, the synthesizing section 15b obtains (E(x,y)= E(x,y)+E(MhDI[-k](x,y), MvDI[-k](x,y))) by superposing, in step S286, a pixel value E(MhDI[-k](x,y), MvDI[-k] (x,y)) of a pixel whose motion vector terminal position is a pixel for processing on the frame number (-k) designated by an occluding portion direct motion vector, on the pixel value E(x,y), to update and store the value in the buffer 15c.

Namely, as to any pixel being an occluding area, its pixel value is superposed on the basis of an occluding portion direct motion vector, and as to any pixel not being the occluding area, its pixel value is superposed on the basis of a direct motion vector, using the respective occlusion maps Mo(x,y).

In step S287, the occlusion determining section 15a increments the counter x by 1.

In step S288, the occlusion determining section 15a determines whether or not the counter x is smaller than xSize being the horizontal image size, and if so, the processing returns to step S284. Namely, the processing of steps S284 to S288 is repeated until direct motion vectors are obtained for all horizontally extending pixels at y. And if it is determined in step S288 that the counter x is not smaller than xSize, i.e., if it is determined that the processing is completed for a single horizontal row, the processing proceeds to step S289.

In step S289, the occlusion determining section 15a increments the counter y by 1.

In step S290, the occlusion determining section 15a determines whether or not the counter y is smaller than ySize being the vertical image size, and if so, the processing returns to step S283. Namely, processing of steps S283 to S290 is repeated until direct motion vectors are obtained for all horizontally extending pixels at y. And if it is determined in step S290 that the counter y is not smaller than ySize, i.e., if it is determined that the processing is completed for all the pixels in both horizontal and vertical directions, the processing proceeds to step S291.

In step S291, the occlusion determining section 15a increments the counter k by 1.

In step S292, the occlusion determining section 15a determines whether or not the counter k is equal to N or less being the number of images for superposition, and if so, the processing returns to step S282. Namely, processing of steps S282 to S292 is repeated until the processing is performed on all the images for superposition to remove noise.

And when it is determined in step S292 that the counter k is neither equal to nor less than N, i.e., when all the direct motion vectors are obtained for each pixel on all the images for superposition, the synthesizing section 15b obtains (E(x, y)=(E(x,y) IN) by dividing, in step S293, the pixel value E(x,y) of each pixel stored in the buffer 15c by the number N of superposed images, to normalize the pixel value.

In step S294, the image synthesizing unit 15 outputs the images accumulated in the buffer 15c to the image display unit 3.

Returning here to FIG. 13, the description of the flowchart shown therein is continued.

When an image, whose noise is removed by synthesizing a plurality of images by the image synthesizing unit 15 performing step S6, is outputted, the image display unit 3 displays the image supplied thereto in step S7.

In an occluding area, a motion vector from a frame number (-k) to a frame number (-k+1) is compared with a motion vector from the frame number (-k+1) to a frame number (-k+2), and if the difference between them is equal to or greater than a predetermined value, the pixel is considered to be an occluded background, and thus the motion vector thereof is excluded. When this processing is performed on all the pixels, it has been feared that even some pixels not being an unoccluding area might be excluded. Particularly, when motion vectors are not accurate enough, any pixel whose motion vector undergoes a radical change due to error may likely be recognized incorrectly. To overcome this situation, the above processing makes it possible to realize robust processing by designing such that this processing is not performed on any area other than occlusion maps on the basis of occlusion map Mo information.

Note that in the foregoing, an example in which images taken by the imaging unit 1 are displayed on the image display unit 3 after their noise is removed has been described. Images may include those not taken by the imaging unit 1. Also, noise-removed images may be used for purposes other than for display. For example, recorded images, or network-distributed images may be subjected to the noise removal. Furthermore, noise-removed images may, of course, be recorded or network-distributed, instead of being displayed.

By the way, the series of image processing described above can be performed not only by hardware, but by software as well. When the series of processing is executed by software, a program constituting the software is installed in a computer incorporated into dedicated hardware, or in a general-purpose personal computer that can execute various processing by installing various programs therein, from a recording medium.

Figure 27:
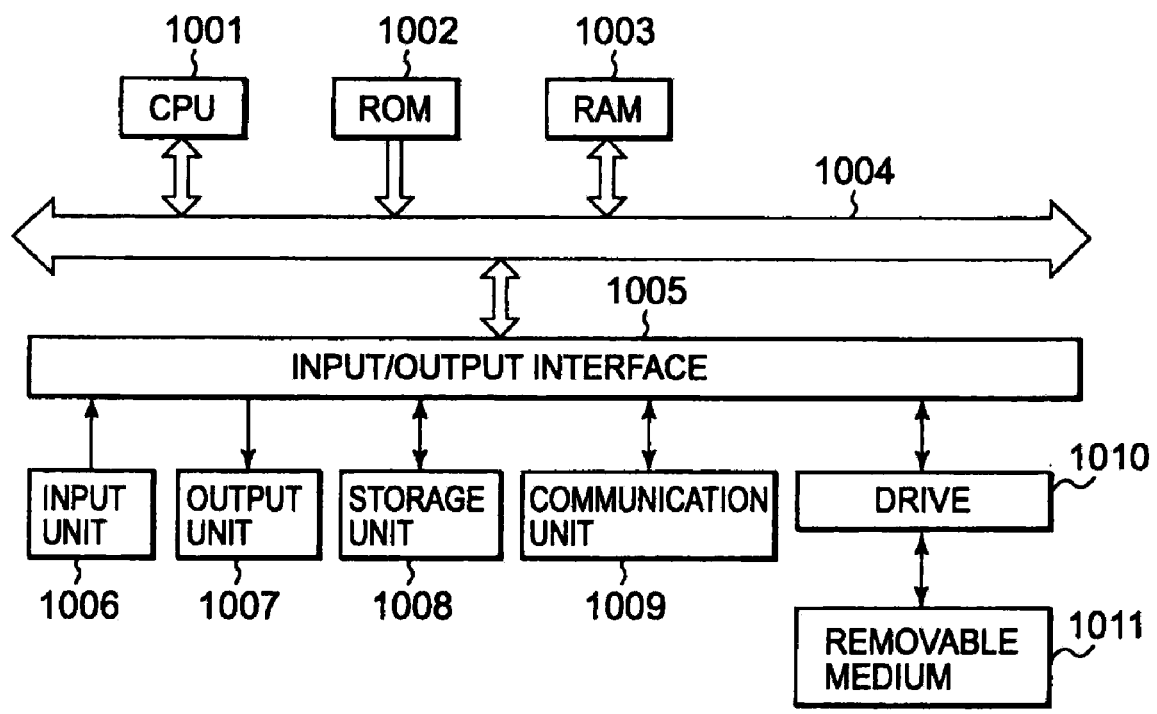
FIG. 27 is a diagram illustrating a configuration example of a personal computer.

FIG. 27 shows a configuration example of a general-purpose personal computer. This personal computer incorporates therein a Central Processing Unit (CPU) 1001. To the CPU 1001, an input/output interface 1005 is connected with a bus 1004 in between. To the bus 1004, a Read Only Memory (ROM) 1002 and a Random Access Memory (RAM) 1003 are connected.

To the input/output interface 1005, there are connected an input unit 1006 including input devices, such as a keyboard and a mouse that allow a user to enter control commands, an output unit 1007 that outputs processing control screens or images resulting from processing to a display device, a storage unit 1008 including a hard disk drive that stores programs and various data, and a communication unit 1009 including a LAN (Local Area Network) adapter, or the like that executes communication processing via a network represented by the Internet. To the input/output interface 1005, there is also connected a drive 1010 that reads/writes data to/from a removable medium 1011, such as a magnetic disk (including a flexible disk), an optical disc (including a CD-ROM (Compact Disc Read Only Memory) and a DVD (Digital Versatile Disc)), a magneto-optical disc (including a MD (Mini Disc)), or a semiconductor memory.

The CPU 1001 executes various processing according to a program stored in the ROM 1002, or a program installed in the storage unit 1008 while read from the removable medium 1011, such as a magnetic disk, an optical disc, a magneto-optical disc, or a semiconductor memory, and the like, and then loaded to the RAM 1003 from the storage unit 1008. The RAM 1003 also stores data necessary for the CPU 1001 to execute the various processing as appropriately.

Note that in the present specification, steps describing the program recorded on the recording medium may include not only processing executed time-sequentially in the described order, but also processing executed parallelly or individually, not necessarily time-sequentially.

In addition, the system used in the present specification means a whole apparatus configured of a plurality of apparatus.

According to one embodiment of the present invention, images taken can be processed more naturally and sharply.

It should be understood by those skilled in the art that various modifications, combinations, sub-combinations and alternations may occur depending on design requirements and other factors insofar as they are within the scope of the appended claims or the equivalents thereof.

The present application claims benefit of priority of Japanese patent Application No. 2006-216022 filed in the Japanese Patent Office on Aug. 8, 2006, the entire content of which being incorporated herein by reference.

What is claimed is:

1. An image processing apparatus comprising:
   motion vector extracting means for extracting a motion vector on a pixel basis, from each of a plurality of input images;
   direct motion vector generating means for generating a direct motion vector to a pixel on an image for processing from a pixel on each of the plurality of input images, on the basis of motion vectors extracted by the motion vector extracting means;
   synthesizing means for synthesizing the plurality of input images by using a pixel value of the pixel on each of the plurality of input images, on the basis of the direct motion vector generated by the direct motion vector generating means; and
   wherein the direct motion vector generating means includes
      occluding area detecting means for detecting an occluding area in each of the plurality of input images, on the basis of the motion vectors extracted by the motion vector extracting means;
      exposing area detecting means for detecting an exposing area in each of the plurality of input images, on the basis of the motion vectors extracted by the motion vector extracting means; and
      calculating means for calculating the direct motion vector out of the occluding area in consideration of the exposing area, and the direct motion vector of the occluding area, by using motion vectors extracted by the motion vector extracting means, on the basis of information about the occluding area detected by the occluding area detecting means and information about the exposing area detected by the exposing area detecting means.

2. The image processing apparatus according to claim 1, wherein the synthesizing means synthesizes the plurality of input images by superposing the pixel value of each of the plurality of input image on a pixel value of each pixel of the image for processing, on the basis of the direct motion vector generated by the direct motion vector generating means.

3. The image processing apparatus according to claim 1, wherein the exposing area detecting means detects a pixel which is among pixels on the current image and whose terminal point of a reverse-time motion vectors does not exist on a past image, as the exposing area, on the basis of the motion vectors extracted by the motion vector extracting means.

4. The image processing apparatus according to claim 3, wherein the exposing area detecting means includes:
   plot map generating means for generating, on an image basis, a plot map in which a frame number of the image is assigned into the pixel detected as the exposing area; and
   exposing area occlusion distance map generating means for generating an exposing area occlusion distance map into which an exposure-starting frame number is assigned, for each pixel on the current image, by synthesizing one plot map corresponding to a past image into another.

5. The image processing apparatus according to claim 1, wherein the occluding area detecting means
   detects a pixel which is set as a terminal point of at least two or more motion vectors among motion vectors in the past image, which is pointed by reverse-time direction motion vectors of pixels on the current image, as the occluding area.

6. The image processing apparatus according to claim 5, wherein the occluding area detecting means
   further includes occlusion map generating means for generating an occlusion map in which the pixel detected as the occluding area is plotted.

7. An image processing method implemented by at least one processor comprising:
   a motion vector extracting step of extracting a motion vector on a pixel basis, from each of a plurality of input images;
   a direct motion vector generating step of generating a direct motion vector to a pixel on an image for processing from a pixel on each of the plurality of input images, on the basis of motion vectors extracted in the motion vector extracting step;
   a synthesizing step of synthesizing the plurality of input images by using a pixel value of the pixel on each of the plurality of input images, on the basis of the direct motion vector generated in the direct motion vector generating step; and
   wherein the direct motion vector generating step includes
      an occluding area detecting step for detecting an occluding area in each of the plurality of input images, on the basis of the motion vectors extracted in the motion vector extracting step;
      an exposing area detecting step for detecting an exposing area in each of the plurality of input images, on the basis of the motion vectors extracted in the motion vector extracting step; and
      a calculating step for calculating the direct motion vector out of the occluding area in consideration of the exposing area, and the direct motion vector of the occluding area, by using motion vectors extracted in the motion vector extracting step, on the basis of information about the occluding area detected in the occluding area detecting step and information about the exposing area detected in the exposing area detecting step.

8. The image processing method according to claim 7, wherein the synthesizing step includes
   synthesizing the plurality of input images by superposing the pixel value of each of the plurality of input image on a pixel value of each pixel of the image for processing, on the basis of the direct motion vector generated in the direct motion vector generating step.

9. The image processing method according to claim 7, wherein the exposing area detecting step includes
  detecting a pixel which is among pixels on the current image and whose terminal point of a reverse-time motion vectors does not exist on a past image, as the exposing area, on the basis of the motion vectors extracted in the motion vector extracting step.

10. The image processing method according to claim 9, wherein the exposing area detecting step includes:
  a plot map generating step for generating, on an image basis, a plot map in which a frame number of the image is assigned into the pixel detected as the exposing area; and
  an exposing area occlusion distance map generating step for generating an exposing area occlusion distance map into which an exposure-starting frame number is assigned, for each pixel on the current image, by synthesizing one plot map corresponding to a past image into another.

11. The image processing method according to claim 7, wherein the occluding area detecting step includes
  detecting a pixel which is set as a terminal point of at least two or more motion vectors among motion vectors in the past image, which is pointed by reverse-time direction motion vectors of pixels on the current image, as the occluding area.

12. The image processing method according to claim 11, wherein the occluding area detecting step further includes
  an occlusion map generating step for generating an occlusion map in which the pixel detected as the occluding area is plotted.

13. A non-transitory computer-readable medium containing a program, which, when executed by a processor, causes a computer to perform an image processing method, the program comprising the steps of:
  a motion vector extracting step of extracting a motion vector on a pixel basis, from each of a plurality of input images;
  a direct motion vector generating step of generating a direct motion vector to a pixel on an image for processing from a pixel on each of the plurality of input images, on the basis of motion vectors extracted in the motion vector extracting step;
  a synthesizing step of synthesizing the plurality of input images by using a pixel value of the pixel on the plurality of input images, on the basis of the direct motion vector generated in the direct mot-on vector generating step; and
  wherein the direct motion vector generating step includes
    an occluding area detecting step for detecting an occluding area in each of the plurality of input images, on the basis of the motion vectors extracted in the motion vector extracting step;
    an exposing area detecting step for detecting an exposing area in each of the plurality of input images, on the basis of the motion vectors extracted in the motion vector extracting step; and
    a calculating step for calculating the direct motion vector out of the occluding area in consideration of the exposing area, and the direct motion vector of the occluding area, by using motion vectors extracted in the motion vector extracting step, on the basis of information about the occluding area detected in the occluding area detecting step and information about the exposing area detected in the exposing area detecting step.

14. A non-transitory program storage medium in which the program according to claim 13 is stored thereon.

15. An image processing apparatus comprising:
  a processor, and
  a memory coupled to the processor,
  wherein the memory is encoded with one or more instructions that, when executed by the processor, define;
    a motion vector extracting unit for extracting a motion vector on a pixel basis, from each of a plurality of input images;
    a direct motion vector generating unit for generating a direct motion vector to a pixel on an image for processing from a pixel on each of the plurality of input images, on the basis of motion vectors extracted by the motion vector extracting means;
    a synthesizing unit for synthesizing the plurality of input images by using a pixel value of the pixel on each of the plurality of input images, on the basis of the direct motion vector generated by the direct motion vector generating means; and
  wherein the direct motion vector generating unit includes
    an occluding area detecting unit for detecting an occluding area in each of the plurality of input images, on the basis of the motion vectors extracted by the motion vector extracting unit;
    an exposing area detecting unit for detecting an exposing area in each of the plurality of input images, on the basis of the motion vectors extracted by the motion vector extracting unit; and
    a calculating unit for calculating the direct motion vector out of the occluding area in consideration of the exposing area, and the direct motion vector of the occluding area, by using motion vectors extracted by the motion vector extracting unit, on the basis of information about the occluding area detected by the occluding area detecting unit and information about the exposing area detected by the exposing area detecting unit.

16. The image processing apparatus according to claim 15, wherein the synthesizing unit
  synthesizes the plurality of input images by superposing the pixel value of each of the plurality of input image on a pixel value of each pixel of the image for processing, on the basis of the direct motion vector generated by the direct motion vector generating unit.

17. The image processing apparatus according to claim 15, wherein the exposing area detecting unit includes
  detecting a pixel which is among pixels on the current image and whose terminal point of a reverse-time motion vectors does not exist on a past image, as the exposing area, on the basis of the motion vectors extracted by the motion vector extracting unit.

18. The image processing apparatus according to claim 17, wherein the exposing area detecting unit includes
  a plot map generating unit for generating, on an image basis, a plot map in which a frame number of the image is assigned into the pixel detected as the exposing area; and
  an exposing area occlusion distance map generating unit for generating an exposing area occlusion distance map into which an exposure-starting frame number is assigned, for each pixel on the current image, by synthesizing one plot map corresponding to a past image into another.

19. The image processing apparatus according to claim 15, wherein the occluding area detecting unit
   detects a pixel which is set as a terminal point of at least two or more motion vectors among motion vectors in the past image, which is pointed by reverse-time direction motion vectors of pixels on the current image, as the occluding area.

20. The image processing apparatus according to claim 19, wherein the occluding area detecting unit further includes
   an occlusion map generating unit for generating an occlusion map in which the pixel detected as the occluding area is plotted.

* * * * *